US 8,494,673 B2

(12) United States Patent
Miranda et al.

(10) Patent No.: US 8,494,673 B2
(45) Date of Patent: Jul. 23, 2013

(54) WAREHOUSE SYSTEM AND METHOD FOR OPERATING THE SAME

(75) Inventors: Febres Patricio Miranda, Wels (AT); Timothy Lindley, Wels (AT)

(73) Assignee: TGW Logistics Group GmbH, Wels (AT)

( * ) Notice: Subject to any disclaimer, the term of this patent is extended or adjusted under 35 U.S.C. 154(b) by 330 days.

(21) Appl. No.: 12/736,905

(22) PCT Filed: May 26, 2009

(86) PCT No.: PCT/AT2009/000220
§ 371 (c)(1),
(2), (4) Date: Dec. 7, 2010

(87) PCT Pub. No.: WO2009/143548
PCT Pub. Date: Dec. 3, 2009

(65) Prior Publication Data
US 2011/0106295 A1    May 5, 2011

(30) Foreign Application Priority Data

May 26, 2008 (AT) .................................. A 841/2008

(51) Int. Cl.
*G06F 7/00* (2006.01)
(52) U.S. Cl.
USPC ........... 700/216; 700/213; 700/214; 700/218; 700/219; 700/220; 700/245; 700/230
(58) Field of Classification Search
None
See application file for complete search history.

(56) References Cited

U.S. PATENT DOCUMENTS

| 5,733,098 | A | 3/1998 | Lyon et al. |
|---|---|---|---|
| 7,097,045 | B2 | 8/2006 | Winkler |
| 2002/0117429 | A1 | 8/2002 | Takizawa |
| 2007/0005180 | A1* | 1/2007 | Stingel et al. ................. 700/213 |
| 2010/0278625 | A1 | 11/2010 | Wolkerstorfer |

FOREIGN PATENT DOCUMENTS

| AT | 506 886 | 12/2009 |
|---|---|---|
| DE | 203 20 338 | 5/2004 |
| DE | 20 2007 009 399 | 9/2007 |
| DE | 10 2006 058 523 | 6/2008 |
| EP | 1 698 573 | 9/2006 |
| GB | 2 265 893 | 10/1993 |
| WO | WO 98/39236 | 9/1998 |
| WO | WO 2008/041838 | 4/2008 |
| WO | WO 2009/094681 | 8/2009 |

OTHER PUBLICATIONS

International Search Report.

* cited by examiner

*Primary Examiner* — Yolanda Jones
(74) *Attorney, Agent, or Firm* — Collard & Roe, P.C.

(57) ABSTRACT

The invention relates to a warehouse system and a method of operating the same, whereby a plurality of different packaging units (2) are placed in storage on delivery pallets as storage units in a goods-in store (4). The properties of the packaging units are detected in a data bank and a conveying property is determined from the packaging unit properties, and a classification group is assigned to the packaging units (2) by a computer. The packaging units (2) are distributed, temporarily stored and loaded onto despatch pallets in the warehouse system in accordance with the classification group.

23 Claims, 15 Drawing Sheets

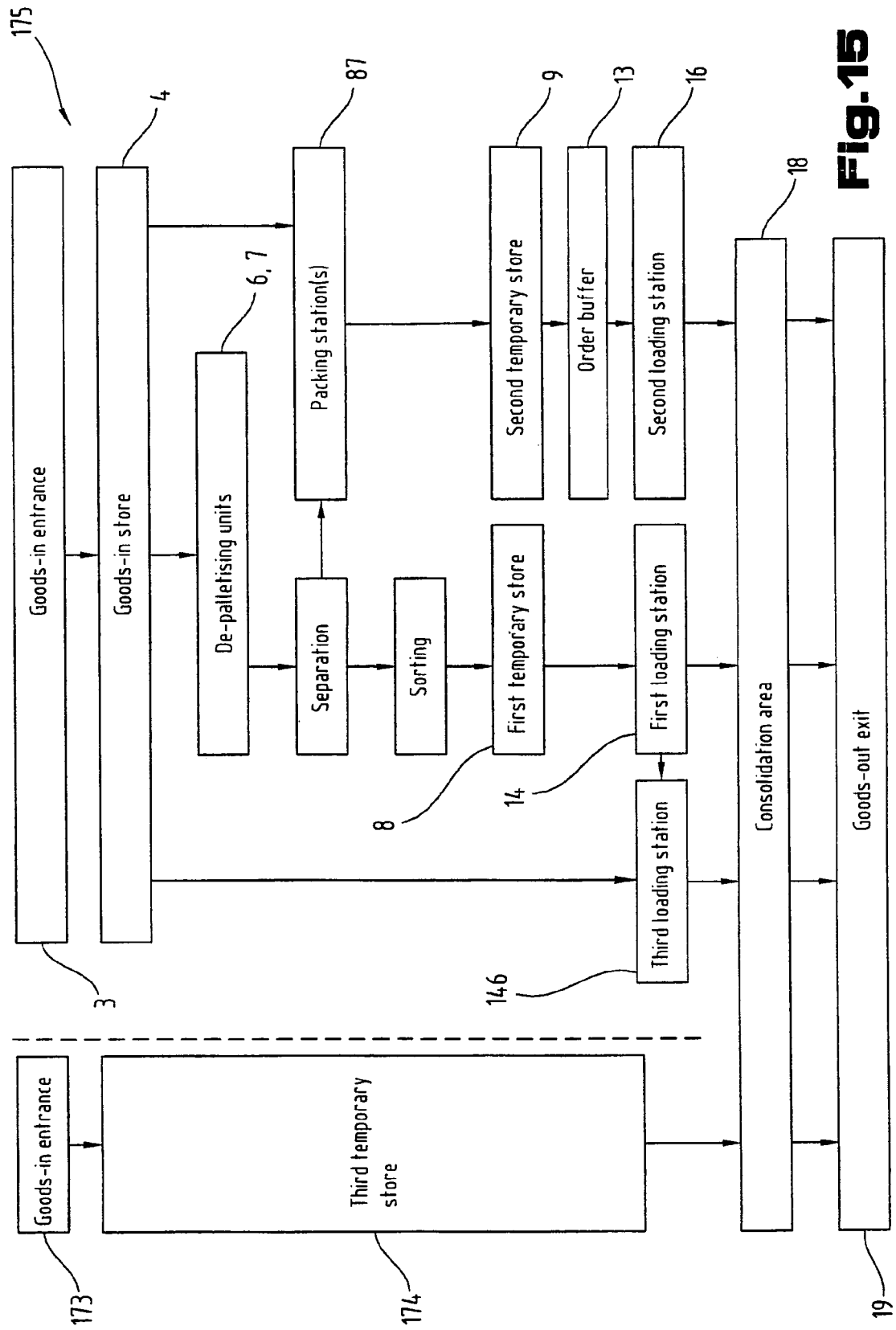

WAREHOUSE SYSTEM AND METHOD FOR OPERATING THE SAME

CROSS REFERENCE TO RELATED APPLICATIONS

This application is the National Stage of PCT/AT2009/000220 filed on May 26, 2009, which claims priority under 35 U.S.C. §119 of Austrian Application NO. A 841/2008 filed on May 26, 2008, the disclosure of which is incorporated by reference. The international application under PCT article 21(2) was not published in English.

The invention relates to a method of operating a warehouse system and the warehouse system itself as described below.

EP 1 698 573 A1 discloses a storage and picking system and a method of operating it whereby packaging units are transferred onto pallets at receiving stations, temporarily stored in goods-in warehouse systems (pallet stores) by means of a shelf conveyor system and removed from pallets in accordance with a subsequent order system, separated and individually transferred to trays. A packaging unit constitutes the smallest unit in a freight despatch. A packet of several articles held together by means of a film represents a packaging unit. The trays are conveyed to a temporary store (tray storage facility), where they are held in storage. When the warehouse management computer detects a customer order, the requisite packaging units are removed and placed on the trays, sorted in a loading sequence defined on the basis of a loading configuration in the load stack and forwarded to an automatic stacking unit. On arriving there, the packaging unit is lifted off the tray and transferred to a stationary loading plate and then stacked on a despatch pallet in accordance with the loading configuration. Every packaging unit is deposited on a separate tray and buffered in the tray storage facility. The tray storage facility has an individual storage place for each tray. The warehouse system should be in a position to pick several thousand packaging units per day. Due to the large number of packaging units to be picked, it is necessary to make a large number of storage places available. The numerous storage places are distributed around a plurality of racking shelves in the tray storage facility. This requires a large amount of space for erecting the racking shelves and high procurement costs. A larger tray storage facility will require an increasing number of conveyor systems, thereby resulting in an increase in energy costs as well.

Patent specification U.S. Pat. No. 5,733,098 A describes a method of operating a warehouse system whereby the packaging units are removed from stacks on pallets by means of handling units and forwarded via the conveyor tracks depending on a customer order to an automatic stacking device, and are then stacked on a freight pallet by the latter based on an optimised loading configuration. The packaging units are conveyed without any additional loading aids such as trays, regardless of their properties such as dimensions, type and such like. As a result, only a very limited assortment of packaging units can be handled and it is necessary to use appropriate conveyor systems through the entire storage facility, which incurs higher procurement costs than standardised conveyor systems.

The underlying objective of this invention is to propose a method of operating a warehouse system, which is distinctive due to the fact that it is economic and offers high availability, even when handling what is usually a very broad assortment of articles (packaging units).

The objective is achieved by the features and characteristics according to the invention. Based on the method and warehouse system proposed by the invention, several thousand different packaging units can be commissioned per day. The packaging units are of different types, for example they are very sensitive to breakage or compression stress (fragile), have the smallest of dimensions, different dimensional stabilities (flexible or dimensionally stable), have external packaging with different surface properties or are such that they can only be manipulated in a specific position, etc. The broad range of packaging units, the large number of customer orders and the different types of packaging units require an extremely high throughput rate of packaging units on the one hand and reliable distribution (conveying) and storage in the warehouse system without disruptions on the other hand. Against this background, the invention proposes detecting conveying properties and assigning a classification group to every type of packaging unit. On the basis of this classification group, the packaging units can be distributed and stored in the warehouse system on a fully automated or partially automated basis. Overall, this leads to a very reliable and economic way of operating the warehouse system.

Based on a feature defined in an embodiment, the properties that are detected for each packaging unit type are those which have crucial implications in terms of the method used to convey and store it.

The feature defined in another embodiment is also of advantage because at least three classification groups are assigned to the packaging units. The first classification group covers those packaging units which can be distributed and stored in the warehouse system between an input and output station on a fully automated basis, the second classification group covers those packaging units which can be distributed and stored in the warehouse system between an input and an output station on a partially automated basis and the third classification group covers those packaging units which have to be stored in the warehouse system between an input and output station on a fully automated basis but have to be distributed manually. The packaging units of the first classification group can be both distributed and stored in the warehouse system without additional loading aids such as trays and similar, whereas the packaging units of the second classification group have to be manually transferred from storage units to load carriers and distributed and stored by them. The order volume of the packaging units in the second classification group (less than 20%) corresponds to only a small proportion compared with the packaging units of the first classification group (more than 80%). The order volume of packaging units in the third classification group corresponds to approximately 5% or less. Although load carriers are used for the packaging units of the second classification group, albeit even in the case of a small order volume, these are loaded with a plurality of packaging units as a rule. Accordingly, storage of the packaging units compared with the warehouse systems known from the prior art which require loading aids for every packaging unit represents a highly efficient use of space and higher storage density (ratio of the volume of packaging units to storage volume) and offers a particularly economic warehouse system with a high availability.

Also of advantage is another embodiment because the packaging units are not taken out of the goods-in store (pallet store), de-palletized, distributed and assembled to make up a picking order deposited in the temporary store (compartmentalized racking store) until picking orders have been detected. Loading aids (trays) and complex devices for loading the packaging units onto the loading aids and removing the packaging units from the loading aids can be dispensed with.

Also of advantage is the feature defined in another embodiment because the packaging units at the first loading station are conveyed in a loading sequence which is optimized for stacking on the dispatch pallet. The loading sequence is generated by a computer, in particular a computer program, on the basis of a loading configuration which is computed and optimized with regard to stability, volume usage and the height of the stack.

Based on the feature defined in another embodiment, the packaging units are only conveyed to the storage shelf which contains free storage spaces and can be filled with packaging units and leading to which runs an inbound track of the packaging unit distribution system, which is able to handle the transfer of the packaging units without delay and convey the packaging units to the storage shelving.

The feature defined in another embodiment results in an increase in the efficiency of the packaging unit distribution system, in particular a shelf conveyor vehicle servicing the storage positions or storage shelves, because there is no need for packaging units to be transferred by the shelf conveyor vehicle within the storage shelves to enable packaging units to be picked in order-related storage passages. The packaging units are already in the sequence needed for the load carrying device of the shelf conveyor vehicle to place them in the order-related passages. The sequence is set up on an inbound track still, operated separately from the shelf conveyor vehicle.

If the packaging units are sorted and placed in order-related storage passages as defined in another embodiment, the temporary store used to buffer the order can be designed to cater for the average order volume. The temporary store is preferably provided in the form of a compartmentalized racking store and the packaging units are deposited in the storage positions on the compartment bases without additional loading aids such as trays and such like. EP 1 698 573 A1 describes a system whereby only a single packaging unit is deposited, in principle irrespective of the dimensions of each and every individual packaging unit. This means that only a few packaging units can be stored in a storage passage and the tray storage facility is filled to only a low capacity. By contrast with this, based on one embodiment of this invention, the number of storage positions is determined solely by the dimensions of the packaging units needed for a picking order and not by the spatial dimensions of a tray.

Also of advantage is the feature defined in another embodiment, because the packaging units previously grouped in storage passages to form a picking order are moved out of the temporary store as packaging unit group(s) and these are sorted in a defined sequence either as they are moved out of storage or in a subsequent sorting step, in a sorter conveyor unit. Since the packaging units are moved out of storage as a group, the efficiency of the packaging unit distribution system and throughput rate of dispatched delivery units can be increased.

As a result of the feature defined in another embodiment, the condition constituting the principle for an optimum loading sequence by which the load stack is rendered particularly stable and easy to transport is defined, and good use can be made of the loading capacity of the dispatch lorry. Furthermore, this reduces costs whilst simultaneously improving loading efficiency.

The feature defined in another embodiment results in a fine sorting of the packaging units with the packaging unit group (s), thereby offering another step of optimizing building of the stack.

Based on the feature defined in another embodiment, those packaging units not needed for a picking order, for example once the packaging units have been removed in layers from the storage units and separated, are detected by the computer and free storage passages are determined in the temporary store in which the packaging units are temporarily stored. These storage passages are defined as what are referred to as overflow passages and are preferably completely filled with the packaging units. When a picking order is detected by the computer, a comparison can be run to ascertain whether the packaging units needed for this picking order are disposed in one of the overflow passages. If this is the case, the overflow passage or passages is or are defined as order passages. This enables optimum use to be made of the storage capacity made available by the storage shelves, resulting in a high filling level.

Also of advantage is another embodiment because those packaging units which cannot be process by the automated packaging unit distribution system in all of its conveyor sections can be handled in the warehouse system separately from the packaging units of the first classification group. For example, these might be packaging units of specific dimensions or which are fragile or have only a low dimensional stability (are flexible), and they can be transferred to load carriers from the outset at a packing station, in particular containers, and transported by a load carrier distribution system to the second temporary store (top-up store), where the load carriers are buffered. This rules out disruptions during the process of transporting the packaging units in the warehouse system as far as possible.

The features of another embodiment are of advantage because other packaging units with a low turnaround (C articles) can be picked from a freight carrier in a single picking step in a particularly efficient manner.

Based on another embodiment, the freight carriers are made ready for each customer order in an order buffer and are not transported to a consolidation area until a dispatch pallet has been loaded. The person handling the consolidation no longer has to concentrate on the picking process but merely has to ensure that the finished delivery units are grouped in a delivery sequence. This enables a high throughput of delivery units to be achieved in the consolidation area, even though the delivery units are grouped in the delivery sequence by a person handling the consolidation.

Advantageous features are also defined in another embodiment because the second temporary store is used as a top-up store with a short "range" of 1.5 to 7 days and the picking and delivery stock for the detected customer orders and a buffer stock are held in supply there. A top-order is not generated unless a minimum stock level of freight and storage carriers is reached, in which case the computer generates a top-up order, packaging units are transferred to load carriers and "sent to top up" to the temporary store.

As defined in another embodiment, the packaging units of the third classification group, for example articles with a low turnaround frequency (C articles), such as bulky or irregular-shaped items, remain in the goods-in store and are removed from a storage passage by a warehouse operator by means of a distribution truck and loaded onto a first dispatch pallet. Since there is no transport by an automated distribution system, disruptions caused by the distribution can be avoided.

Due to the system of uniquely identifying packaging units as described in another embodiment, the packaging units are reliably assigned to the classification groups.

Also of advantage is the feature defined in another embodiment because more or less the same range of articles (packaging units) is stored in the storage shelves in at least certain areas of the store within the goods-in store and storage unit distribution system, in particular the shelf conveyor vehicle, and capacity is used more or less uniformly in its conveyor runs.

Due to the feature defined in another embodiment, the storage units delivered to the receiving stations can be buffered on the conveyor track and distributed to every aisle of the goods-in store. The storage units are conveyed to the aisles where they are needed. This results in optimum adaptation of the warehouse stock held in the storage shelves.

The feature defined in another embodiment is of particular advantage because storage units are removed from a storage shelf in the relevant area of the store and conveyed by the conveyor track assigned to it to at least one de-palletizing unit. There is no need for these storage units to be transferred from one conveyor track to the other conveyor track. The storage units are conveyed to the respective de-palletizing unit by the shortest route, which is also made easier if the conveyor tracks are disposed in the immediate vicinity at a terminal end of the goods-in store. The conveyor tracks are preferably connected to one another by one or more connecting tracks, thereby enabling the storage units to be switched between the conveyor tracks and delivered to every de-palletizing unit.

Since the load is secured as defined in another embodiment, the freight units are transported from the dispatch stations to the customer more safely.

Due to the feature defined in another embodiment, the delivery units that were dispatched last are loaded into the deepest loading position on the delivery vehicle, whereas the delivery units that were dispatched first are loaded into the foremost loading position on the delivery transport vehicle. The person handling the delivery is able to unload the dispatch units belonging to an order at every outlet without having to search for dispatch units on the delivery vehicle.

Another advantageous feature is defined in a further embodiment, whereby the dispatch units are not conveyed through the same warehouse and distribution processes as the packaging but are handled by independent warehouse and distribution processes. In other words, picking, storing and distribution processes relating to one customer order take place simultaneously in several areas of the warehouse system. Due to the parallel operation of the storing, picking and/or distribution processes, the throughput of delivery and dispatch units can be increased or the warehouse system can be operated for a significantly shorter time whilst handling the same throughput.

As a result of another embodiment, the packaging units are separated before they are sorted and stacked, which makes handling much easier.

Another embodiment is of advantage because a circular sorting machine (high-performance sorting machine), in particular a transverse belt sorter, can be driven continuously in a conveyor circuit and the packaging units can be conveyed from an inbound gate conveyor at the sorting inlet to an inbound track at the sorting outlet without the conveyor circuit having to be stopped. This results in a high throughput at the circular sorting machine. Furthermore, the circular sorting machine requires only a small number of electrical driving motors and can be operated with a low energy consumption, even at a high throughput rate. Due to the small number of drives, a high availability of the circular sorting machine can be achieved. Another advantage resides in the fact that the packaging units removed from the storage unit by means of the de-palletizing unit(s) can be conveyed via the circular sorting machine to every aisle once they have been separated and are thus conveyed to each storage passage by short conveyor runs. As a result, the basic system for placing packaging units in storage in any storage passages that are free based on the picking orders can be operated on the chaotic storage principle. This makes the warehouse system more economical. Furthermore, it is of advantage to use the circular sorting machine, in particular the transverse belt conveyor, because there are no relative movements between a conveyor support and the packaging unit in the conveyor circuit, thereby enabling reliable conveying at high conveying and sorting speeds.

Another embodiment describes a sorting unit of a particularly simple design.

Finally, another embodiment is of advantage because sorting can be operated efficiently by means of the sorting conveyor unit.

To provide a clearer understanding, the invention will be explained in more detail below with reference to the appended drawings.

These provide highly schematic, simplified diagrams as follows:

FIG. 15 is a block diagram illustrating a modified design of the warehouse system.

Figure 1:
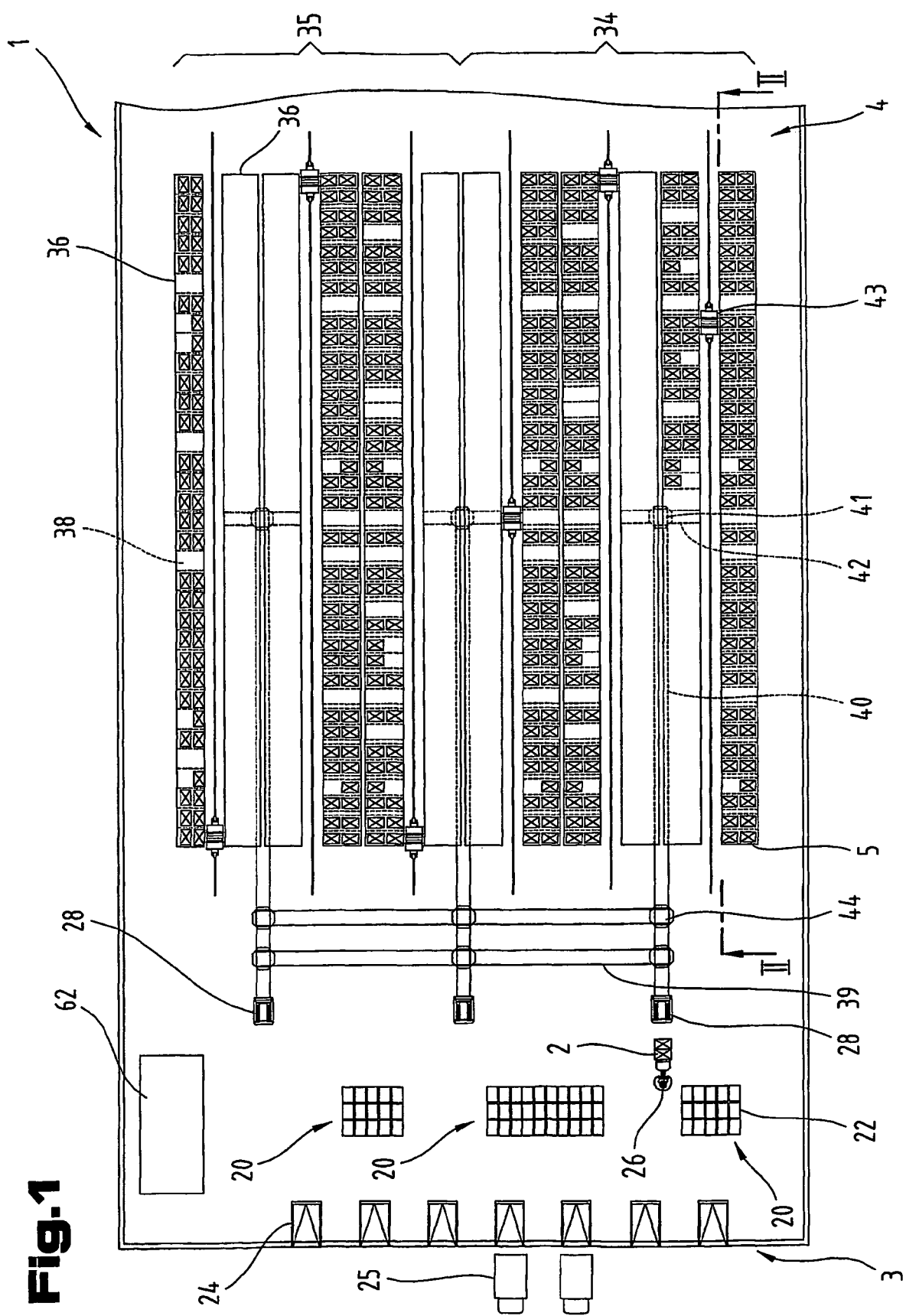
FIG. 1 is a plan view of an goods-in store at the goods-in entrance of the warehouse system proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIGS. 1 to 15, which will be described together, illustrate a warehouse system 1 as proposed by the invention, which is automated in particular and specifically used for storing, distributing and/or picking different packaging units 2 (packages). The warehouse system 1 comprises a goods-in entrance 3, a goods-in store 4 for temporarily storing storage units 5, de-palletising units 6, 7, a first temporary store 8 for temporarily storing the packaging units 2, a second temporary store 9 for temporarily storing freight and storage carriers, at least one picking area in the second temporary store 9, an order buffer 13 for the freight carriers, a first loading station 14 for loading the packaging units 2 onto a first despatch pallet 15, a second loading station 16 for loading the freight carriers onto a second despatch pallet 17, a consolidation area 18, a warehouse unit distribution system, a packaging unit distribution system and a load carrier distribution system as well as a goods-out exit 19. The number of de-palletising units is freely selectable. Provided between the goods-in entrance 3 and the goods-in store 4 are goods-in buffer zones 20 whilst goods-out buffer zones 21 are provided in the consolidation area 18. The goods-in and goods-out buffer zones 20, 21 each have depositing areas 22, 23 disposed one after the other in a row, which in one embodiment are defined by markings on the floor of the warehouse building, for example.

Several goods-in stations 24 are provided at the goods-in entrance 3, alongside which supplier transport vehicles 25 dock, in particular lorries, and the storage units 5 are transferred by a warehouse operator 26 to a distribution vehicle 27 and either temporarily stored in at least one depositing area 22 in a goods-in buffer zone 20 or conveyed by the storage unit distribution system to a receiving station 28 which has one end facing the goods-in buffer zones 20.

Figure 2:
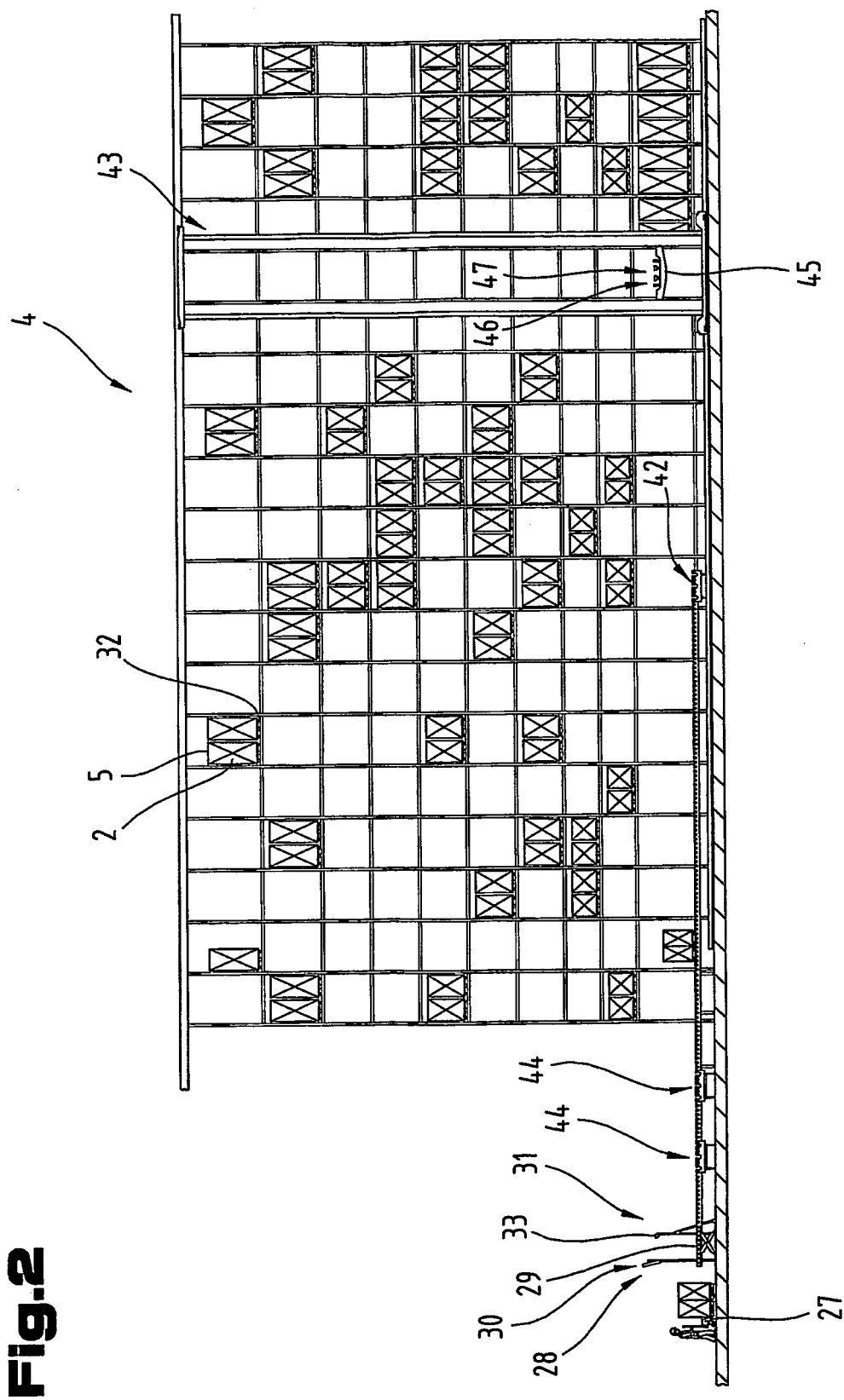
FIG. 2 is a side view of the goods-in store illustrated in FIG. 1 along line II-II indicated in FIG. 1.

As illustrated more clearly in FIG. 2, every receiving station 28 has a lifting table which can be moved between a lowered transfer position and a raised conveying position and is equipped with a conveyor track 29. The conveyor track 29 comprises rollers extending parallel and at a distance apart, for example. The conveyor track 29 might just as easily be provided in the form of a belt conveyor or similar.

The receiving stations 28 are each equipped with an input and/or output device 30 in the form of an optical and/or acoustic display, for example a monitor, by means of which a warehouse operator 26 is advised by the computer, in particular the warehouse management computer, which storage unit 5 must be transferred to which receiving station 28. Not only does this ensure that the flow of goods is coordinated, it also ensures that storage units 5 are not sent to a receiving station 28 for which they were not intended.

The storage unit distribution system has an inspection station 31 at every receiving station 28, by means of which the quality of the delivery pallet 32, the load status on the delivery pallet 32 and/or an inbound inspection of the packaging unit 2 is conducted before the storage unit 5 is moved to the goods-in store 4 for storage.

At the goods-in entrance 3, preferably at the inspection station 31, the packaging units 2 are also identified by means of a packaging unit identification system, for example a reading device 33 or image processing system. For example, data is read from a data carrier applied to the delivery pallet 32, for example a EURO pallet, Chep pallet, Düsseldorf pallet and such like, by the manufacturer/supplier of the packaging units 2, and in particular a barcode is scanned. However, the data carrier may also be provided in the form of a transponder, magnetic stripe or a RFID label (Radio Frequency Identification Device) and such like.

The electronically identified packaging units 2 are then transported away from the lifting station together with the delivery pallet 32 serving as a storage unit 5 and stored in the goods-in store 4. The packaging units 2 on the delivery pallet 32 are preferably stacked by type.

If the data cannot be read adequately, for example because the data carrier has been partially damaged during transportation of the storage units 5 to the warehouse system 1, an error message is displayed to the warehouse operator 26 on the output device 30. The warehouse operator 26 must then ensure that he identifies from a stock list of packaging units on the input device 30 listing the entire range of packaging units 2 the packaging unit 2 contained in the storage unit 5. By selecting the correct packaging unit 2 from the stock list, a new data carrier is created, for example a new barcode label is printed on a printer. The data carrier is attached to the delivery pallet 32. Only then is the storage unit 5 transported away from the lifting table and sent for storage in the goods-in store 4.

The goods-in store 4, which is laid out in the form of a vertical racking system, is split up into storage areas 34, 35 and comprises parallel, mutually adjacent storage shelves 36, and an aisle 37 is disposed between the storage shelves 36 lying opposite and at a distance apart from one another. The storage shelves 36 have storage levels lying vertically one above the other spaced apart in a pattern. Several "virtual" storage passages 38 are disposed in every storage level and the storage passage 38 incorporates at least one or more storage spaces in its longitudinal extension and at least two storage units 5 oriented centrally to one another can be deposited in a row one behind the other in a storage passage 38.

The goods-in store 4 also has the automated storage unit distribution system, which comprises, in the goods-in and goods-out level (first level—FIG. 1, 2) a closed circulating conveyor in several conveyor sections, receiving stations 28, inbound tracks 40 adjoining the receiving stations 28 at one end, distributor tracks 41 adjoining an end remote from the receiving stations 28 and processing tracks 42 on either side of the distributor tracks 40, as well as computer-controlled shelf conveyor vehicles 43. The inbound tracks 40 are each provided in the form of an accumulation conveyor and have accumulation areas one after the other in the conveying direction. The accumulation conveyor is equipped with at least one conveyor means driven by a motor for each accumulation area. The circulating conveyor is provided in the form of a chain conveyor, for example, and has storage unit switching conveyor devices 44 in the intersecting regions. Every shelf conveyor vehicle 43, in particular a shelf servicing device, is able to move in the aisle 37 along a track system alongside the front of the shelving and is equipped with a platform 45 which can be raised and lowered. Disposed on the platform 45 is a load bearing device comprising at least one conveyor device 46 and an inbound and outgoing handling device 47 which can be extracted in both directions relative to the platform, in particular telescopic cables, by means of which the storage units 5 can be moved into and out of a storage passage 38 of the storage shelf 36 to the left or right of the aisle 37.

At the transfer level (second level—FIG. 3) the storage unit distribution system has closed conveyor tracks 48, 49 in several conveyor sections at one of the terminal ends of the goods-in store 4 and closed inward and/or outbound tracks 50, 51 adjoining each of them and co-operating respectively with a storage area 34, 35 and conveyor tracks 52 adjoining a conveyor track for load carriers as well as conveyor tracks 53, 54 respectively adjoining the conveyor track 48, 49. The conveyor tracks 48, 49, provided in the form of a chain conveyor for example, may also be linked to one another by means of a connecting track 55 and have storage unit switching conveyor devices 56, 57 in the intersecting regions.

The storage units 5 are removed from the storage passages 38 by means of the shelf conveyor vehicles 43 and conveyed to the inbound and/or outbound tracks 50, 51. On arrival there, the storage units 5 are conveyed onwards by the outbound tracks 51, part-sections of the conveyor tracks 48, 49 and conveyor tracks 53, 54 to the de-palletising units 6, 7. At each de-palletising unit 6, 7, the storage units 5 are lifted to a third level—as indicated by broken lines—where the packaging units 2 are removed from the pallets, in particular from the uppermost stack layer respectively.

After the de-palletising operation, the storage units 5 which have been partially de-palletised at each de-palletising unit 6, 7 or the empty delivery pallets 32 are lowered to the transfer level by the lifting table and conveyed away on the conveyor tracks 53, 54. The storage units 5 that have been removed from pallets (opened pallets) are conveyed by the conveyor tracks 53, 54, part-sections of the conveyor tracks 48, 49 and inbound tracks 50 to the shelf conveyor vehicles 43 and put back into the goods-in store 4 by them. The empty delivery pallets 32 are conveyed by the conveyor tracks 53, 54 to a stacking device 58 and stacked by it one on top of the other. On reaching a specific height, the stacks are conveyed by part-sections of the conveyor tracks 48, 49 to a sorting unit 59, where the different types of delivery pallets 32 are sorted into types and stacked at collection stations 60. The sorted stacks are then conveyed to a lifting device 61 and lowered from the transfer level to the delivery and despatch level and placed in a buffer area 62 (FIG. 1) ready for re-use.

The computer, in particular the warehouse management computer, has a storage unit allocation module amongst other things, by means of which a warehouse indicator is determined for each storage shelf 36, such as the level of filling, warehouse throughput and/or stock level of storage units 5, and/or a performance indicator in a conveyor section of the storage unit distribution system, such as capacity usage at the receiving stations 28 of the inbound tracks 40, shelf conveyor vehicles 43, conveyor tracks 39, 48, 49 and/or de-palletising units 6, 7. The computer is incorporated in an electronic controller, for example a memory-programmable controller.

The warehouse inventory defines the quantity of different articles stored in a storage shelf 36. The warehouse throughput is defined by the number of storage units 5 moved into a storage passage 38 and out of a storage passage 38. The warehouse level status indicates the ratio between available storage spaces and occupied storage spaces.

The capacity usage of the storage unit distribution system can be determined on the basis of the throughput or throughput time of the storage units 5 at the receiving stations 28, the inbound tracks 40 and/or the number of arrival and despatch operations. Sensors are used to detect the throughput, throughput time and/or number of arrival and despatch operations, for example, and/or these are calculated by the computer.

The actual value of the warehouse indicator for the storage shelves 38 and/or performance indicator is compared with a desired value of the warehouse indicator for the storage shelves 38 and/or the performance indicator in a comparison module of the computer, in particular the warehouse management computer. If the actual value of the warehouse indicator in one of the storage areas 34, 35 and/or the performance indicator in a conveyor section of the storage unit distribution system falls below the desired value, the storage units 5 in this storage area 34, 35 are placed in storage. If, on the other hand, the actual value is moving close to the desired value or reaches the desired value, this means that the maximum stock level, warehouse throughput and/or storage level has been reached in a storage area 34, 35, for example, and the storage units 5 in the storage area 34, 35 where the actual value has fallen below the desired value must be placed in storage and there are still storage passages 38 that are unoccupied. The actual value of the warehouse indicator and/or the performance indicator is calculated by means of monitoring elements, in particular detected by sensors and/or calculated by the computer. Distributing the storage units 5 in the goods-in store 4 enables a mutual adaptation of the warehouse indicators in both storage areas 34, 35.

As described above, the storage units 5 are lifted by a lifting table from the transfer level to a third level and are preferably removed from pallets by the de-palletising unit 6, 7 to make up one stack layer after another based on a picking order or top-up order. The stacked layer removed from pallets by the de-palletising unit 6, 7 is conveyed to a separating track 75, which is linked to a circular sorting machine 76. The separating track 75 serves as a separating system.

Figure 5:
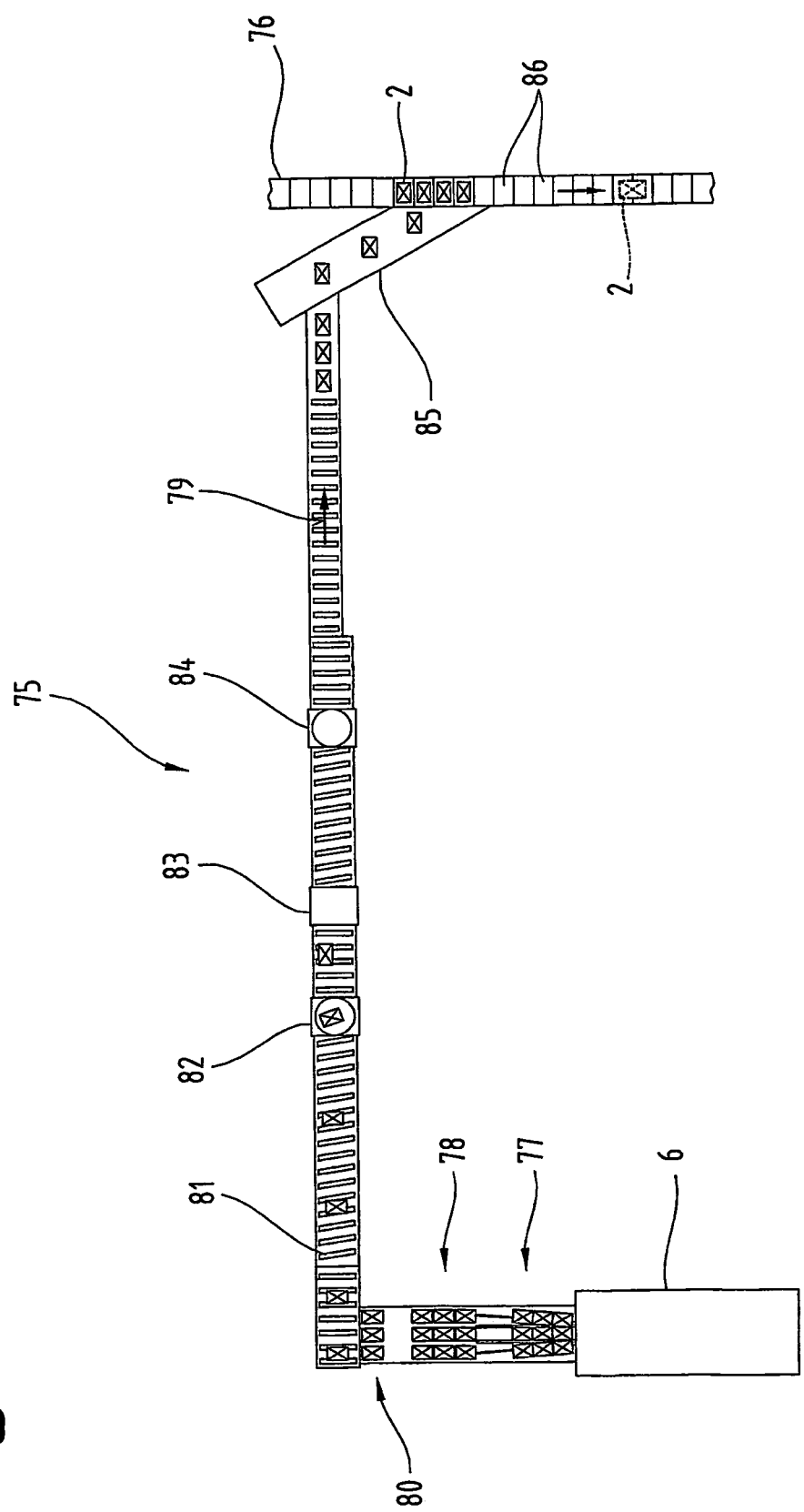
FIG. 5 shows a detail of a separating track illustrated in FIG. 4.

As illustrated in more detail in FIG. 5, the separating track 75 has, in a first conveyor section, a device 77 for placing the packaging units 2 in position in parallel rows and a device 78 for creating a gap between consecutive rows of packaging units 2 in the conveying direction 79 as well as a pushing device 80 by means of which the packaging units 2 are conveyed to a second conveyor section. The packaging units 2 in the second conveyor section which have now been separated are oriented by means of an orienting device, for example obliquely positioned conveyor rollers 81, by means of one of their edges. Disposed one after the other in the second conveyor section in the conveying direction 79 are a rotating device 82, a tilting device 83 and a second rotating device 84. By means of the rotating devices 82, 84, packaging units 2 of different dimensional categories can be rotated so as to assume an orientation needed to enable them to be transferred to a circular sorting machine 76.

If a packaging unit 2 of the smaller dimensional category is being transported in a transverse position, in other words with its shorter side conveyed in the conveying direction 79, it is rotated by 90° at the first rotating device 82 and conveyed transversely to be transferred in this orientation via an inbound gate conveyor 85 to a conveyor support 86 of the circular sorting machine 76, as indicated by solid lines in FIG. 5.

If a packaging unit 2 of the bigger dimensional category is being conveyed lengthways, in other words with its longer side conveyed in the conveying direction 79, it is firstly rotated by 90° at the second rotating device and then conveyed in this orientation, being transported lengthways via the inbound gate conveyor 85 to two conveyor supports 86 of the circular sorting machine 76, as indicated by broken lines in FIG. 5.

The inbound gate conveyor 85 directly adjoining the separating track 75 is provided in the form of a belt conveyor, for example, and its longitudinal axis subtends an angle of approximately 120° with the separating track 75. This enables a virtually jolt-free transfer of the packaging units 2 from the inbound gate conveyor 85 to the circular sorting machine 76.

If a packaging unit 2 with a centre of gravity in a critical position (ratio between the smallest side length and height) is being conveyed and has a tendency to tilt, it is placed on the tilting device 83 and then rotated by 90° at the second rotating device 84 if the packaging unit 2 is being conveyed with its longer side in the conveying direction 79.

The packaging units 2 of the first classification group are conveyed by the packaging unit distribution system in the warehouse system 1 through several sorting stages (FIGS. 6 to 10) after having been separated. The automated packaging unit distribution system comprises, in several conveyor sections, the separating tracks 75, circular sorting machine 76, conveyor track 93, inbound tracks 102, computer-controlled shelf conveyor vehicles 103, sorting conveyor systems 104 and outbound tracks 121.

Figure 6:
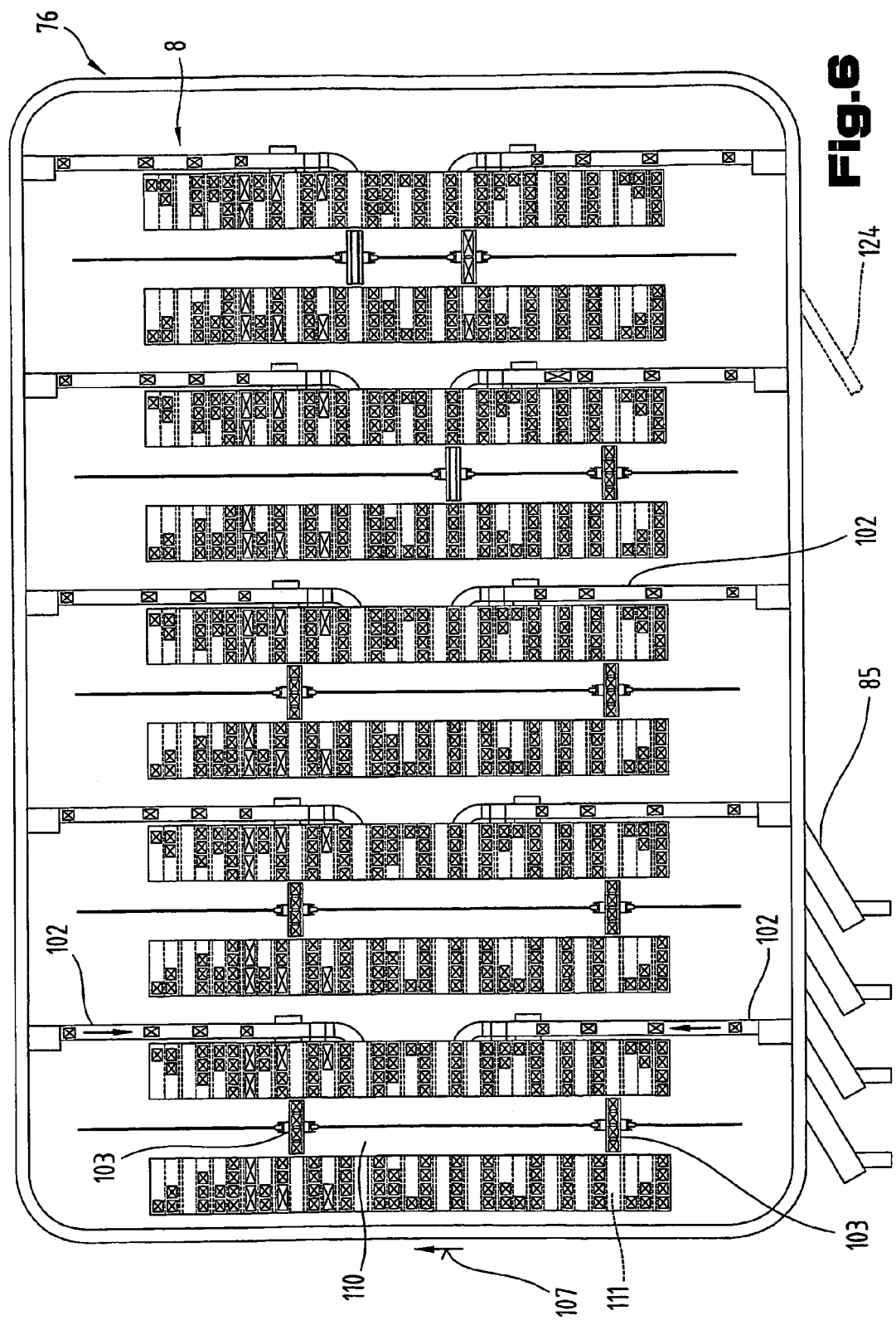
FIG. 6 is a plan view of a first temporary store for storing packaging units and the circular sorting machine.

The circular sorting machine 76 illustrated in FIG. 6 is provided in the first sorting stage, preferably in the form of a transverse belt sorter. In the direction of a conveyor circuit 107, conveyor carriages are displaceably mounted on a frame and mounted on these are linear conveyors which can be controlled independently of one another with a conveying direction extending transversely to the conveyor circuit 107. The linear conveyors, which might be belt conveyors for example, each constitute a conveyor support 86. However, an annular shoe sorter might be used just as easily as the circular sorting machine 76, such as that disclosed in WO 2008/041838 A1 for example.

At the end of a sorting aisle, the circular sorting machine 76 links up with the separating tracks 75 and at the end of a sorting exit links up with the inbound tracks 102. Disposed within the conveyor circuit 107 of the circular sorting machine 76 is the first temporary store 8, which has parallel storage shelves 108, 109 disposed adjacent to one another. Disposed between the mutually spaced apart, oppositely lying storage shelves 108, 109 is an aisle 110. In a preferred embodiment, the storage shelves 108, 109 are provided in the form of compartmentalised racking shelves and the packaging units 2 can be placed directly on the shelf floor without the need for additional loading aids such as trays, pallets and similar. The storage shelves 108, 109 are laid out in a spaced pattern with storage levels lying vertically one above the other, and several "virtual" storage passages 111 are disposed adjacent to one another at every storage level. Every storage passage 111 has at least two storage positions in its longitudinal extension, enabling either two packaging units 2 of a first dimensional category (length of between ca. 200 mm and ca. 500 mm and width of between ca. 200 mm and ca. 350 mm) or four packaging units 2 of a second dimensional category (length of between ca. 500 mm and ca. 800 mm and width of between ca. 300 mm and ca. 600 mm) to be deposited one behind the other in a row.

The shelf conveyor vehicle 103, in particular the rack servicing device, is able to move in the aisle 110 along a track system past the front of the racking and is equipped with a platform 112 which can be raised and lowered. Disposed on the platform 112 is a schematically indicated depositing and removing device by means of which packaging units 2 can be deposited in a storage passage 111 or removed from a storage passage 111. Also disposed on the platform 112 is a conveyor device (not illustrated) by means of which packaging units 2 can be conveyed between processing tracks 113, 114 and the shelf conveyor vehicle 103. The conveyor device and depositing and removing device form a load bearing device. At the first processing track 113, packaging units 2 of the first dimensional category are placed in readiness and at the second processing track 114 packaging units 2 of the second dimensional category are placed in readiness.

The inbound track 102 extends across a part of the length of a storage shelf 108, 109 and incorporates the processing tracks 113, 114 and a buffer station 115 in its end region remote from the circular sorting machine 76. Disposed at the oppositely lying end of the buffer station 115 is an outbound gating system 116. The buffer station 125 has an inward gating system, although this is not illustrated, which may be provided in the form of a belt or pulley conveyor for example. An inbound and outbound gating system may also constitute a unit. The buffer station 115 and outbound gating system 116 form a sorting unit. The sorting unit, in particular the inbound and outbound gating system, are activated by the computer (controller) when a packaging unit 2 has to be gated onto the buffer station 115 from the inbound track 102 or gated from the buffer station 115 back onto the inbound track 102. Disposed in an end region facing the circular sorting machine 76 is a rotating device 117 by means of which packaging units 2 of the second dimensional category can be rotated by 90°.

In the first sorting stage, the packaging units 2 are conveyed at the sorting intake via the inbound gate conveyor 85 to the circular sorting machine 76 and on it in the direction of the conveyor circuit 107 before being gated out on one of the inbound tracks 102 on the basis of a sorting criterion predefined by the computer, in particular the warehouse management computer. The sorting criterion might be a defined warehouse indicator or a performance indicator of the packaging unit distribution system in one of its conveyor sections. The warehouse requirement determines the warehouse indicator.

When picking orders are detected by the computer, in particular the warehouse management computer, they are allocated storage passages 110 and these are defined as order passages. Accordingly, a selection may be made from the computer storage passages 110 in different storage shelves 108, 109 on the basis of the chaotic storage principle. The picking orders respectively comprise one or more identical or different packaging units 2, which are stored in the order passages 118 according to the picking orders. In other words, the storage requirement in terms of packaging units 2 in the relevant order passages 118 in the different storage shelves 107 is known to the computer, and the packaging units 2 are conveyed by the circular sorting machine 76 to the sorting exit via the relevant inbound track 102 to the specific aisle 110 or shelf conveyor vehicle 103 where required.

The sorting criterion may also be defined on the basis of the performance indicator of the packaging unit distribution system, in particular the capacity usage of the packaging unit distribution system in one of its conveyor sections. If a desired value of the performance indicator in a conveyor section of the packaging unit distribution system is reached, for example the maximum capacity (performance threshold) of the inbound track 102 or the shelf conveyor vehicle 103, a packaging unit 2 which might have previously been needed in a storage passage 111 of this aisle 110 is not gated out into this aisle 110 and instead is conveyed to the next aisle 110 at which there is a requirement for this packaging unit 2, and the desired value of the performance indicator was not reached. The capacity usage of the packaging unit distribution system can be determined on the basis of the throughput or throughput time of the packaging units 2 at the circular sorting machine 76, inbound tracks 102, shelf conveyor vehicles 103 and/or the number of storing and removal operations. Sensors are used to detect the throughput, throughput time and/or the number of storage and removal operations and/or this can be calculated by the computer.

The actual value of the performance indicator is compared with the desired value of the performance indicator in a comparison module of the computer. If the actual value of the performance indicator in a conveyor section of the packaging unit distribution system falls below the desired value, packaging units 2 can be conveyed to this conveyor section. The actual value of the warehouse indicator and/or performance indicator is detected by monitoring elements, in particular sensors and/or calculated by the computer.

The packaging units 2 can then be distributed via the inbound tracks 102 to the aisles 110 or shelf conveyor vehicles 103 via the circular sorting machine 76 depending on the detected picking orders. It is of advantage to use a transverse belt sorter because it can be driven in a continuous conveyor circuit and the packaging units 2 can be conveyed from the inbound gate conveyor 85 at the sorting entrance onto the inbound track 102 at the sorting exit without the conveyor circuit having to be stopped. This enables a high throughput rate to be obtained at the circular sorting machine 76.

As also illustrated in FIG. 6, two shelf conveyor vehicles 103 are provided in every aisle 110 and two inbound tracks 102 are disposed opposite one another respectively, which link up with the circular sorting machine 76 at one of their ends and run towards one another at their other end.

The packaging units 2 are gated out onto the inbound tracks 102 and conveyed respectively in the direction towards the processing tracks 113, 114. The packaging units 2 are conveyed on a chaotic basis as a rule and the packaging units 2 are therefore not sorted or grouped, either on the basis of a picking order or on the basis of their dimensional categories.

As described above, the packaging units 2 needed for a picking order are temporarily stored in the storage shelf 108, 109 to the left or right of the shelf conveyor vehicle 103.

Before the packaging units 2 are placed in the order passages 118, a calculation is run to as-certain the stability, capacity usage and/or height and such like to obtain an optimised spatial (three-dimensional) loading configuration of the packaging units 2 in the stack on the despatch pallet 15, for example roll container, pallet. The stack is the most stable and suitable for transport if the heavy packaging units 2 are placed at the bottom part of the stack and the lighter packaging units 2 are placed at the top part of the stack. Similarly, more sensitive packaging units 2 are better accommodated at the top part of the stack. The stack should also be packed as densely as possible and as high as possible in order to make efficient use of the loading capacity in a delivery vehicle.

The packaging units 2 can be uniquely identified by means of an identification code and the spatial loading configuration of one or more stacks on the despatch pallet or pallets 15 can be determined using the dimensions stored in the computer in a data bank. A loading sequence in which the stack will be built up on the despatch pallet 15 is determined from the loading configuration. Accordingly, the packaging units 2 must be brought to the first loading station 14, in particular an automatic stacking device, one after the other in the loading sequence set on the basis of the loading configuration.

The loading sequence is set up in the sorting stages described below.

The initial sorting of the packaging units 2 in the second and third sorting stages will be explained with reference to FIG. 7. Once the individual packaging units 2 conveyed on the inbound track 102 have been identified by means of a packaging unit identification system, for example a reading device 33 or image processing system disposed at the goods-in entrance 3 and/or at the sorting entrance and/or sorting exit and a picking order allocated, they are conveyed through the buffer station 115 on the basis of a predefined sorting criterion, before being deposited in a storage position in an order passage 118, either directly on one of the processing tracks 113, 114 or initially sorted on the basis of their existing storage position in an order passage 118. The storage positions and order passages 118 are fixed by the computer using the chaotic storage principle on the basis of the picking orders before the packaging units 2 are stored in the order passages 118.

The initial sorting is therefore undertaken on the processing tracks 113, 114 and at the buffer station 115. The storage positions of the packaging units 2 are defined by the computer when a customer or picking order is detected and one or more order passages are 118 allocated. The storage position of the packaging units 2 may either be in the left-hand or right-hand storage shelf 108, 109 relative to the shelf conveyor vehicle 102.

The shelf conveyor vehicle 103 may accommodate on the load bearing device either four packaging units 2 of the first dimensional category or two packaging units 2 of the second dimensional category or two packaging units 2 of the first dimensional category and one packaging unit 2 of the second dimensional category.

If more than two packaging units 2 are to be accommodated by the load bearing device in readiness for storing in order passages 118 of the left-hand and right-hand storage shelves 108, 109, the packaging units 2 must be deposited on the loading bearing device in an already fixed sequence that is correct for the order passage 118 for the forthcoming storage operation. In other words, the packaging unit(s) 2 which have to be stored in one or more order passages 118 in the left-hand storage shelf 108 lie on the load bearing device in a left-hand position in the loading direction, whereas the packaging unit(s) 2 which have to be stored in one or more order passages 118 in the right-hand storage shelf 109 are made ready on the load bearing device in a right-hand position in the loading direction.

To ensure that these ready positions for the packaging units 2 on the load bearing device are correct before the packaging units 2 are transferred to the load bearing device, it is necessary for the packaging units 2 to be initially sorted depending on the existing storage position in the order passages 118 in the left-hand and right-hand storage shelves 108, 109, if the packaging units 2 conveyed on the inbound track 102 are being conveyed in a sequence that is not correct for the forthcoming process of storing them in the order passages 118.

The initial sorting process will be explained on the basis of an example below, where four packaging units 2 of the first dimensional category are being conveyed in an incorrect sequence.

The packaging units 2 have already been identified and picking orders and one or more order passages 118 allocated.

The first and last packaging units 2 delivered on the inbound track 102 co-operating with the right-hand storage shelf 109 must be stored in one or more order passages 118 of the left-hand storage shelf 108 and the second and third packaging unit 2 must be stored in one or more order passages 118 of the right-hand storage shelf 109.

The initial sorting process takes place in several steps. First of all, the first packaging unit 2 is conveyed to the first processing track 113 whilst the subsequent packaging units 2 in the conveying direction are temporarily gated out to the buffer station 115 via the outbound gating system 116. The last packaging unit 2 is conveyed past the parked packaging units 2 (overtakes them) and into the first processing track 113 before the packaging units 2 parked in the buffer station 115 are gated back into the inbound track 102 and conveyed to the first processing track 113.

The packaging units 2 can now be conveyed in this sequence, indicated by broken lines, picked up by the load bearing device and conveyed to the storage positions in the order passages 118 in the left-hand and right-hand storage shelves 108, 109.

If, on the other hand, based on a different example, packaging units 2 of the second dimensional category are being stored in order passages 118, the first packaging unit 2 in the conveying direction which has to be conveyed into an order passage 118 in the right-hand storage shelf 109 is firstly gated out to the buffer station 115 via the outbound gating system 116. The second packaging unit 2 in the conveying direction which has to be conveyed into an order passage 118 in the left-hand storage shelf 109 is moved past the parked packaging unit 2 and conveyed to the second processing track 114 before the parked packaging unit 2 is gated back out of the buffer station 115 and conveyed to the second processing track 113.

The packaging units 2 picked up on the load bearing device may belong to one to four picking orders. If the four packaging units 2 are intended for one picking order, they are stored in the single order passage 118. If, on the other hand, the packaging units 2 have each been assigned a picking order, the load bearing device must travel along four order passages 118 and store an individual packaging unit 2 in each of the passages 118. A picking order may be made up of a plurality of packaging units 2, as a result of which packaging units 2 will have to be stored in several order passages 118. The order passages 118 may be assigned to a picking order on the basis of the chaotic storage principle.

This feature improves the efficiency of the packaging unit distribution system, in particular the shelf conveyor vehicle 103, because compared with systems known from the prior art, it is possible to dispense with transferring packaging units 2 via the shelf conveyor vehicle 102 between storage passages 111 in order to set up order passages 118. Unlike the prior art and using the feature described here, the positions assumed on the shelf conveyor vehicle 103 already are those needed to proceed with the storage operation in the order passages 118 in the left-hand and right-hand storage shelves 108, 109. The process of setting up the sequence is run on the inbound track 102 already, independently of the shelf conveyor vehicle 103. The shelf conveyor vehicle 103 is able to distribute the packaging units 2 for one or more picking orders in the storage positions, during which time the next packaging units 2 are being presorted.

Figure 7:
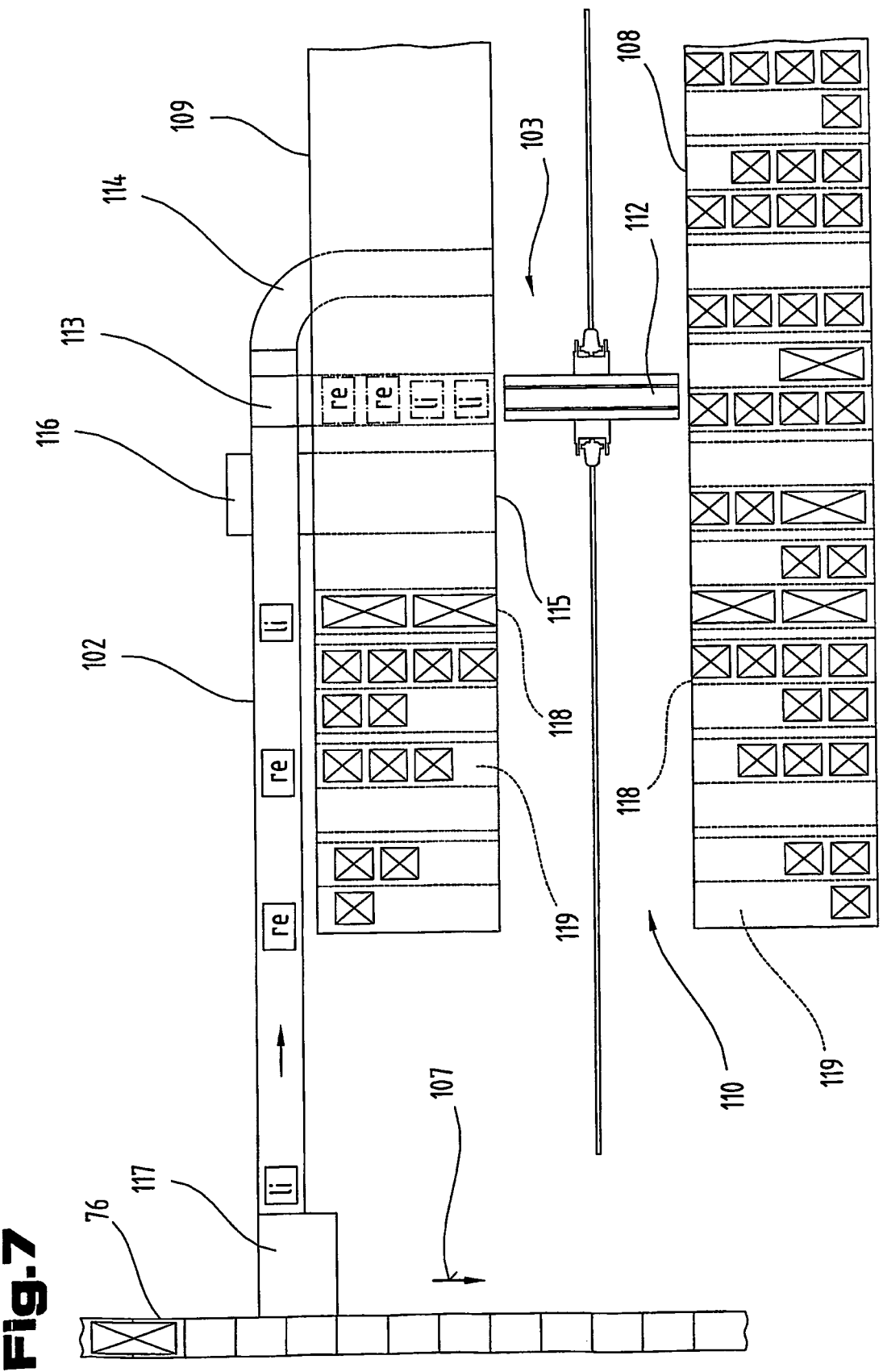
FIG. 7 is a detail on a larger scale illustrating an inbound track und storage shelves of the first temporary store.

As illustrated in FIG. 7, one or more so-called overflow passages 119 are also set up by the computer. These overflow passages 119 contain those packaging units 2 which, although identified, have not yet been assigned to a picking order. As described above, the packaging units 2 are de-palletised from the storage units 5 on the basis of a picking order, preferably in layers. Since a stack layer may contain more packaging units 2 than are needed for a picking order, these are also conveyed to the circular sorting machine 76 after being separated and then via the inbound track 102 to the processing tracks 113, 114. The "surplus" packaging units 2 are picked up by the load bearing device and already existing overflow passages 119 are filled or new overflow passages 119 are set by the computer, in particular the warehouse management computer, where they are then stored.

Different packaging units 2 are stored in these overflow passages 119 and, based on a first embodiment, if a picking order exists, the computer ascertains whether at least one or more packaging unit(s) 2 needed for this picking order or an entire order are stored in one of the overflow passages 119. If this is the case, the packaging unit(s) stored in the overflow passage 119 are assigned to a picking order and the overflow passage 119 is designated as an order passage 118 by the computer.

Figure 8:
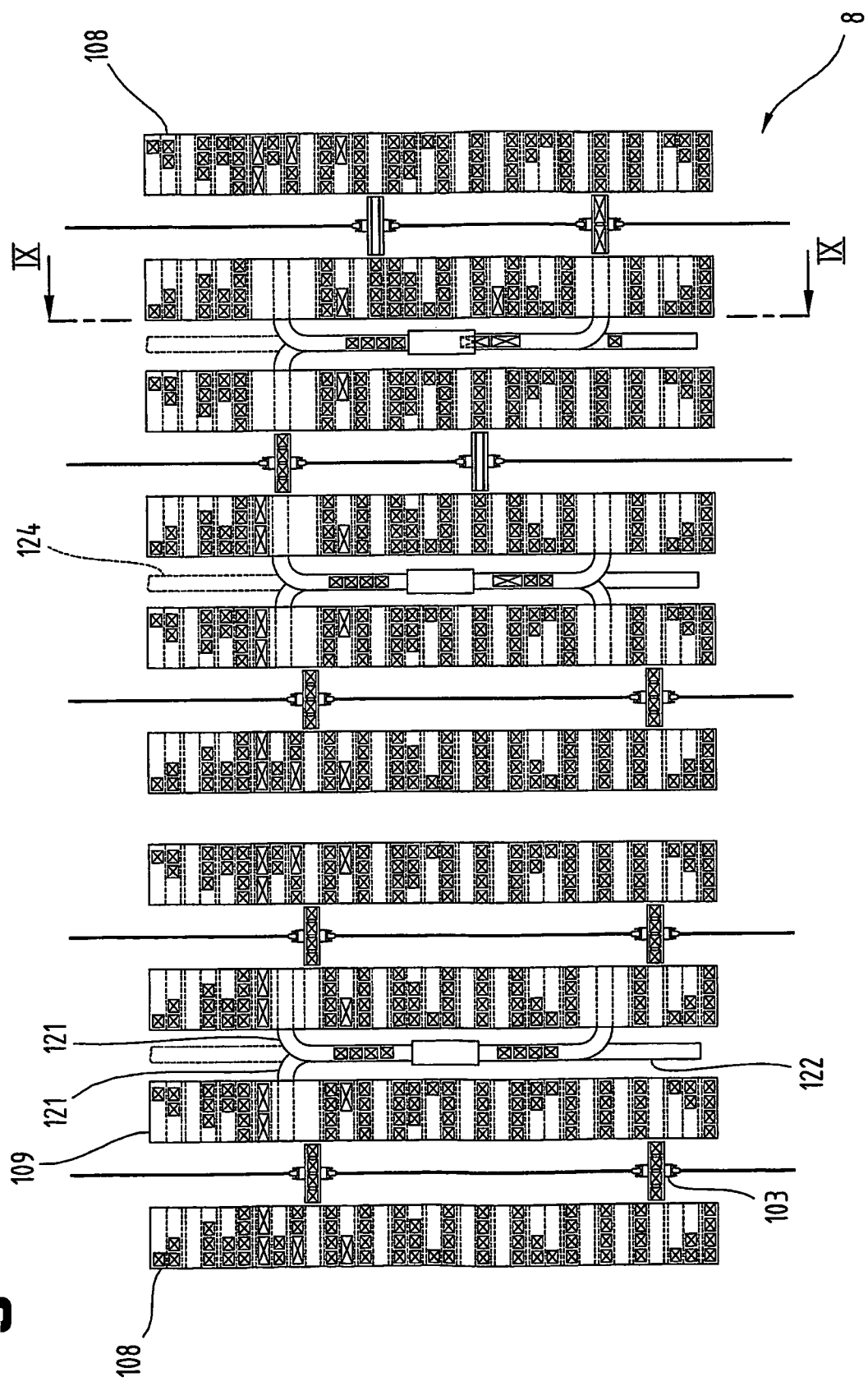
FIG. 8 illustrates the first temporary store with the storage shelves, outbound tracks und processing tracks for packaging unit groups.
Figure 9:
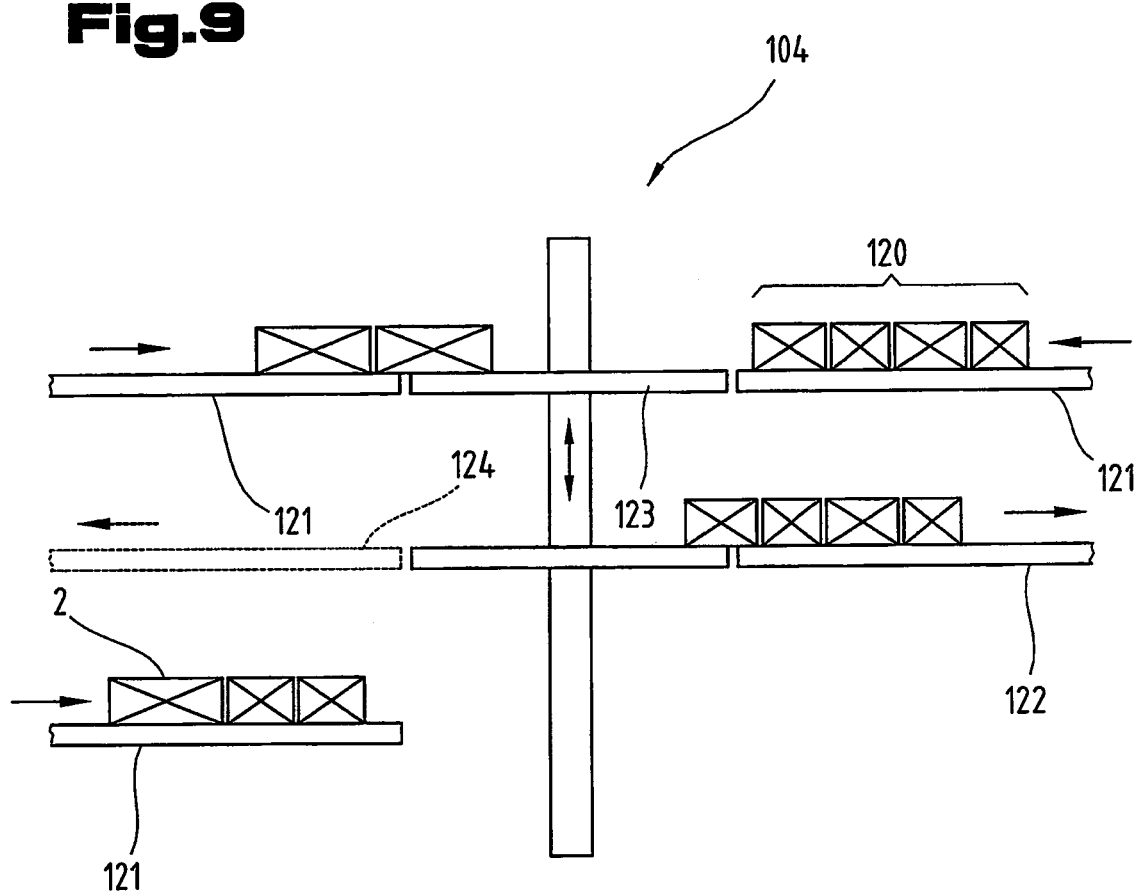
FIG. 9 is a side view of a sorting conveyor system along line IX-IX indicated in FIG. 8.

In another example—indicated by broken lines in FIGS. 6, 8 and 9—the packaging units 2 are removed from the overflow passages 119 by the shelf conveyor vehicles 103 and delivered via the outbound tracks 121 to the sorting conveyor system 104. On arriving there, the packaging units 2 are transferred by a conveyor device (not illustrated) on a platform 123 of the sorting conveyor system 104 to one of the overflow tracks 124 and conveyed by it to the circular sorting machine 76 again. The packaging units 2 then pass through the first to third sorting stages, as described above. However, it may also be necessary to return the packaging units 2 to the circular sorting machine 76 if a picking order is interrupted.

In the fourth sorting stage illustrated in FIGS. 8 and 9, the packaging units 2 stored in one or more order passages 118 in readiness for a picking order are removed by the shelf conveyor vehicle 103 and load bearing device as packaging unit groups 120 and sorted on the basis of sorting criteria predefined by the computer in a defined sequence. As is the case with placing items in storage, the sorting criterion is determined by the spatial loading configuration in the stack on the first despatch pallet 15 and the loading sequence is determined from it. The packaging unit groups 120 are delivered to a sorting conveyor system 104, in particular a sorting lift, and are sorted by it in accordance with the fixed sequence and loading configuration.

As illustrated in FIG. 9, the sorting conveyor system 104 is connected via outbound tracks 121 to two aisles 110 and more than one, preferably three, shelf conveyor vehicles 103, which remove the packaging unit groups 120 grouped together in the order passages 118 to make up a picking order. Each shelf conveyor vehicle 103 is assigned an outbound track 121. The packaging unit groups 120 are then conveyed via the outbound tracks 121 to the sorting conveyor system 104.

The sorting conveyor system 104 has a sorting lift, which links the outbound tracks 121 running in the top level from the first and second shelf conveyor vehicle 103 to the sorting conveyor system 104 and the outbound track 121 running in the bottom level from the third shelf conveyor vehicle 103 to the sorting conveyor system 104 and a loading conveyor track 122 leading away from the first loading station 14. The sorting lift comprises at least one platform 123 which can be raised and lowered, on which a conveyor device (not illustrated) is mounted, for example a belt conveyor, roller conveyor and such like. In one advantageous embodiment, the sorting lift has several platforms 123 which can be raised and lowered with conveyor devices mounted on them.

The packaging unit groups 120 are removed by the shelf conveyor vehicle(s) 103 when the performance indicator drops below a desired value because the shelf conveyor vehicle(s) has or have not yet reached their maximum capacity. Keeping the sorting operation separate from the process of removing items from storage results in an increase in efficiency at the shelf conveyor vehicles 103 and improved throughput efficiency. The packaging unit groups 120, each of which may contain up to four individual packaging units 2, are conveyed in any sequence on the outbound tracks 121 to the sorting conveyor system 104. On arriving there, the packaging unit groups 120 are picked up one after the other by the sorting lift on the basis of the sorting criterion in the loading sequence that will enable the loading configuration to be obtained and are transferred to the loading conveyor track 122 in this sequence.

If the sorting lift has two platforms 123 and conveyor devices, a packaging unit group 120 can be transferred from the outbound track 121 to the first platform 123 at the same time as another packaging unit group 120 is transferred from the second platform 123 to the loading conveyor track 122. This significantly increases throughput efficiency at the sorting lift.

The packaging unit groups 120 sorted into the correct sequence are conveyed via the loading conveyor track 122 to the fifth sorting stage (FIG. 10) and then to the first loading station 14, in particular to an automatic stacking device. The loading station 14 may also have several automatic stacking devices 128.

If the picking order is made up of three packaging unit groups 120, for example, and if the stack is required to be as stable as possible, the first packaging unit group 120 in the conveying direction—indicated by the arrow—contains the packaging units 2 of the heaviest weight category, the second packaging unit group 120 contains the packaging units 2 of the medium weight category and the third packaging unit group 120 contains the packaging units 2 of the lightest weight category. A final sorting operation in the fifth sorting stage is necessary, for example, if the rearmost packaging unit 2 in the conveying direction—indicated by the arrow—is the heaviest in weight but still has to be stacked in a stack, whilst the packaging units 2 lined up in front of it in the conveying direction—indicated by the arrow—have already been stacked in the stack layer lying above. This enables a particularly stable stack to be created. Similarly, a final sorting operation may be run with a view to ensuring good capacity usage, taking care of fragile objects, controlling the height of the stack and such like.

In the fifth sorting stage, therefore, a sorting operation may be run by the computer, in particular the warehouse management computer, within each packaging unit group 120 if necessary on the basis of predefined sorting criteria. A sorting unit is provided for this purpose, which has a buffer station 125 and an outbound gating system 126. Although not illustrated, the buffer station 125 has an inward gating system which may be provided in the form of a belt or pulley conveyor and similar. An inbound and outbound gating system may also be provided as a single unit. The sorting unit, in particular the inbound and outbound gating system, is activated by the computer (controller) when a packaging unit 2 has to be gated out from the loading conveyor track 122 into the buffer station 125 or gated out of the buffer station 125 back onto the loading conveyor track 122.

If the packaging units 2 within every packaging unit group 120 are conveyed in the correct sequence determined from the loading configuration, they pass through this fifth sorting stage and are sent directly to the first loading station 14.

If, on the other hand, the packaging units 2 within a packaging unit group 120 are delivered in a sequence that is not correct for the set loading configuration, the packaging units 2 within this packaging unit group 120 are subjected to a final sorting operation. For example, if the rearmost packaging unit 2 in the first packaging unit group 120 in the conveying direction—indicated by the arrow—is in the first position at the head of the row, the two foremost packaging units 2 in the conveying direction—indicated by the arrow—are gated out via the outbound gating system 126 from the loading conveyor track 122 to the buffer station 125 so that the third packaging unit 2 can be fed past the "parked" packaging units 2 before the "parked" packaging units 2 are gated via the gating system back onto the loading conveyor track 122 and positioned following the packaging unit 2 now occupying the first position, as indicated by broken lines on the middle loading conveyor track 122. This sorting operation enables a final sequence to be obtained, in which the packaging units 2 will be stacked on the first despatch pallet 15.

Shortly before the first loading station 14, the packaging units 2 can be turned again at a rotating device 127 if necessary, in order to set up the pre-calculated loading configuration in the stack.

The packaging units 2 fed to the first loading station 14 in the correct sequence and orientation are preferably stacked on the first despatch pallet 15 by means of the automatic first stacking device 128. Such a stacking device 128 is disclosed in Austrian patent application A 127/2008 filed by the same applicant, which is included in the subject matter of this disclosure by way of reference.

Figure 10:
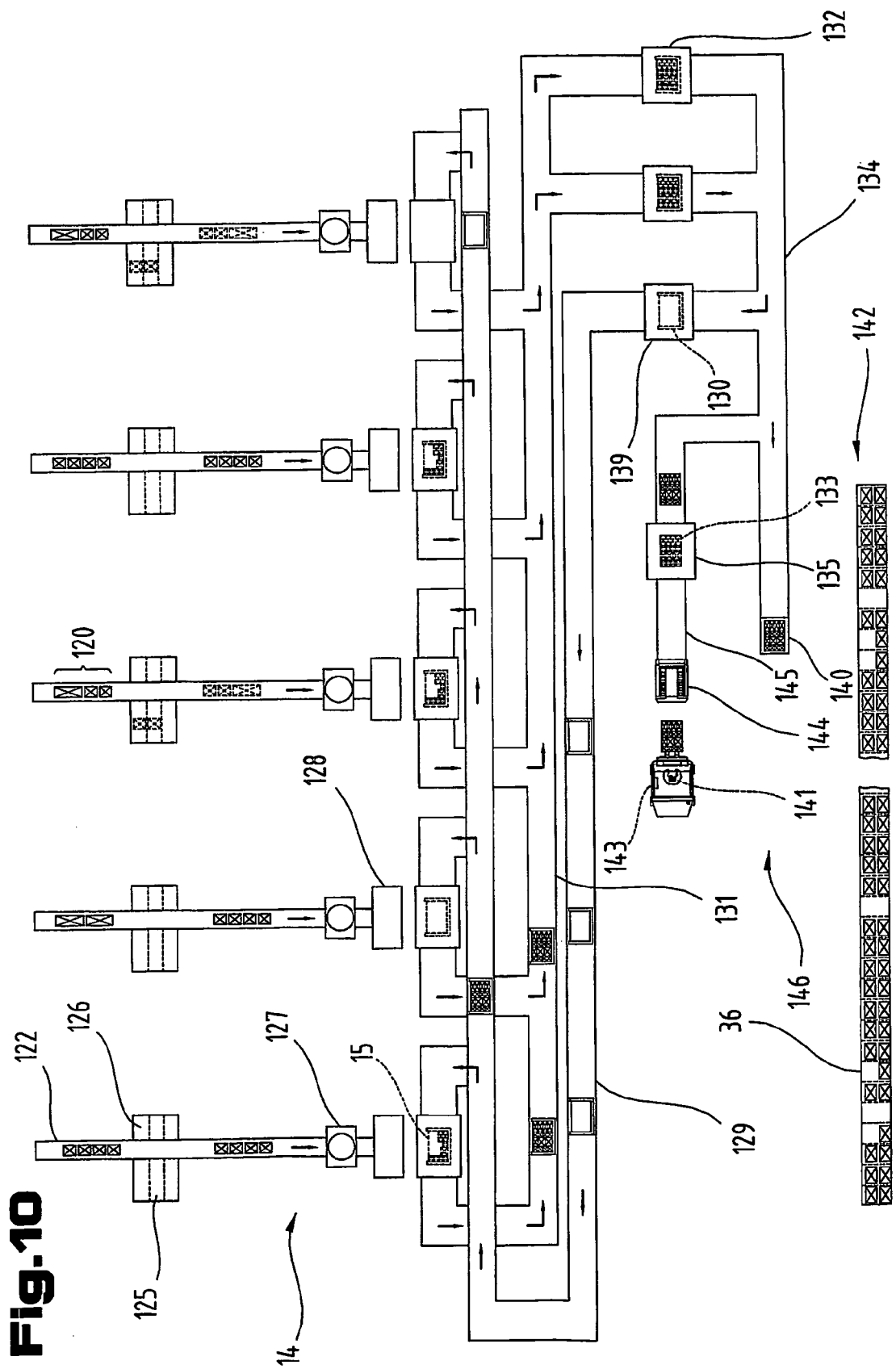
FIG. 10 is a plan view of a first loading station with several stacking devices und wrapping stations of the warehouse system proposed by the invention.

As illustrated in FIG. 10, several first stacking devices 128 are provided, each of which has a despatch pallet changing device adjoining a conveyor unit 129 for bringing in empty despatch pallets 15 and a loading aid 130 disposed on it as well as a conveyor unit 131 for transporting loaded despatch pallets 15 away. The loading aid 130 surrounds the stack from three sides as it is built up and is used as a support surface for a sliding movement of the packaging units 2 in the horizontal direction during stacking.

As soon as a despatch pallet 15 has been fully loaded with a stack, the despatch pallet changing device, which in this example of an embodiment has a drivable roller conveyor, replaces the loaded despatch pallet 15 with an empty despatch pallet 15 with a loading aid 130 disposed on it. The loaded despatch pallet 15 together with the loading aid 130 is conveyed by the conveyor unit 131 to a wrapping station 132 in which the loaded despatch pallet 15 is moved upwards or downwards relative to the loading aid 130 and a released stack is wrapped with a film in order to stabilise the stack.

Figure 14:
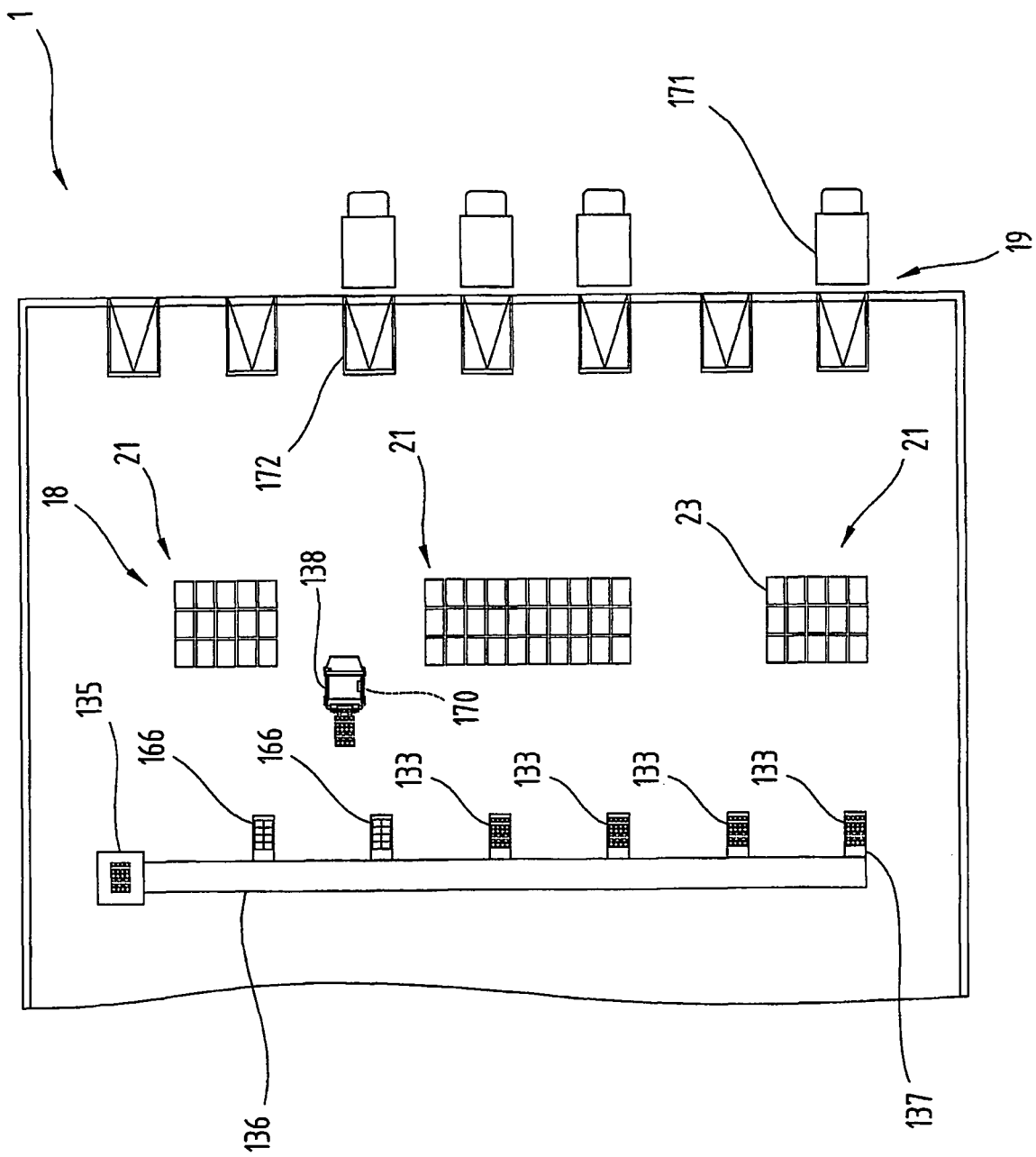
FIG. 14 is a plan view of the goods-in store at the goods exit of the warehouse system proposed by the invention.

As illustrated in FIG. 14, the wrapped stack on the first despatch pallets 15 are now freight units 133 ready for despatch and are conveyed by a conveyor unit 134, lowered by means of a lifting device 135 to the goods-in and despatch level and conveyed via the outbound track 136 to despatch stations 137. On arrival there, they are collected by a consolidation operator, preferably by means of a forklift truck 138, and transported to the depositing areas 23 in the goods-out buffer zones 21, where they are deposited in the delivery sequence fixed on the basis of a customer order.

The empty loading aids 130 are also fed away from the wrapping station 132 by the conveyor unit 134 to a fitting device 139 where the loading aid 130 is fitted to a despatch pallet 15 and fed via the conveyor unit 129 back to one of the stacking devices 128.

Alternatively, there is also a possibility that packaging units of a third classification group, in particular bulky or irregular-shaped items, still have to be loaded onto the wrapped stack, to which end the "partially ready" freight unit 133 is conveyed by the conveyor unit 134 to a despatch station 140, where a warehouse operator 141 loads the still missing bulky items.

The bulky items are temporarily stored in the outer storage area 142 of the goods-in store 4. The "partially ready" freight unit 133 is provided with a data carrier (not illustrated), in particular a barcode, and this freight unit 133 can be identified by taking a reading of the data contained in it, which is displayed to the warehouse operator 141 on an input and/or output device 143 and indicates which bulky item(s) still has or have to be picked for the "partially ready" freight unit 133 at a third loading station 146. The station 146 comprises the despatch and receiving station 140, 144. When the warehouse operator 141 has picked up the bulky items still missing from a picking order, the end of the picking operation is confirmed via the input and/or output device 142. The bulky items are removed from the storage area 142 used to store bulky items in the goods-in store 4 directly by the warehouse operator 141 using a distribution vehicle.

The fully loaded freight units 133 are then deposited at a receiving station 144 and conveyed by a conveyor unit 145 to the lifting device 135, by means of which they are lowered to the goods-in and despatch level where they are conveyed by the outbound track 136 to the despatch stations 137, removed by a consolidation operator and moved to the depositing areas 23 in accordance with the delivery sequence.

Naturally, the packaging units 2 of the third classification group in the third loading station 146, in particular bulky items, can also be loaded onto an empty despatch pallet in accordance with a picking order, which, once the stack has been made secure, is sent to one of the despatch stations 137 (FIG. 14) as a freight unit ready for despatch, although this is not illustrated.

The conveyor flow for the packaging units 2 of a second classification group will be explained below with reference to FIGS. 3, 4 and 11.

Figure 3:
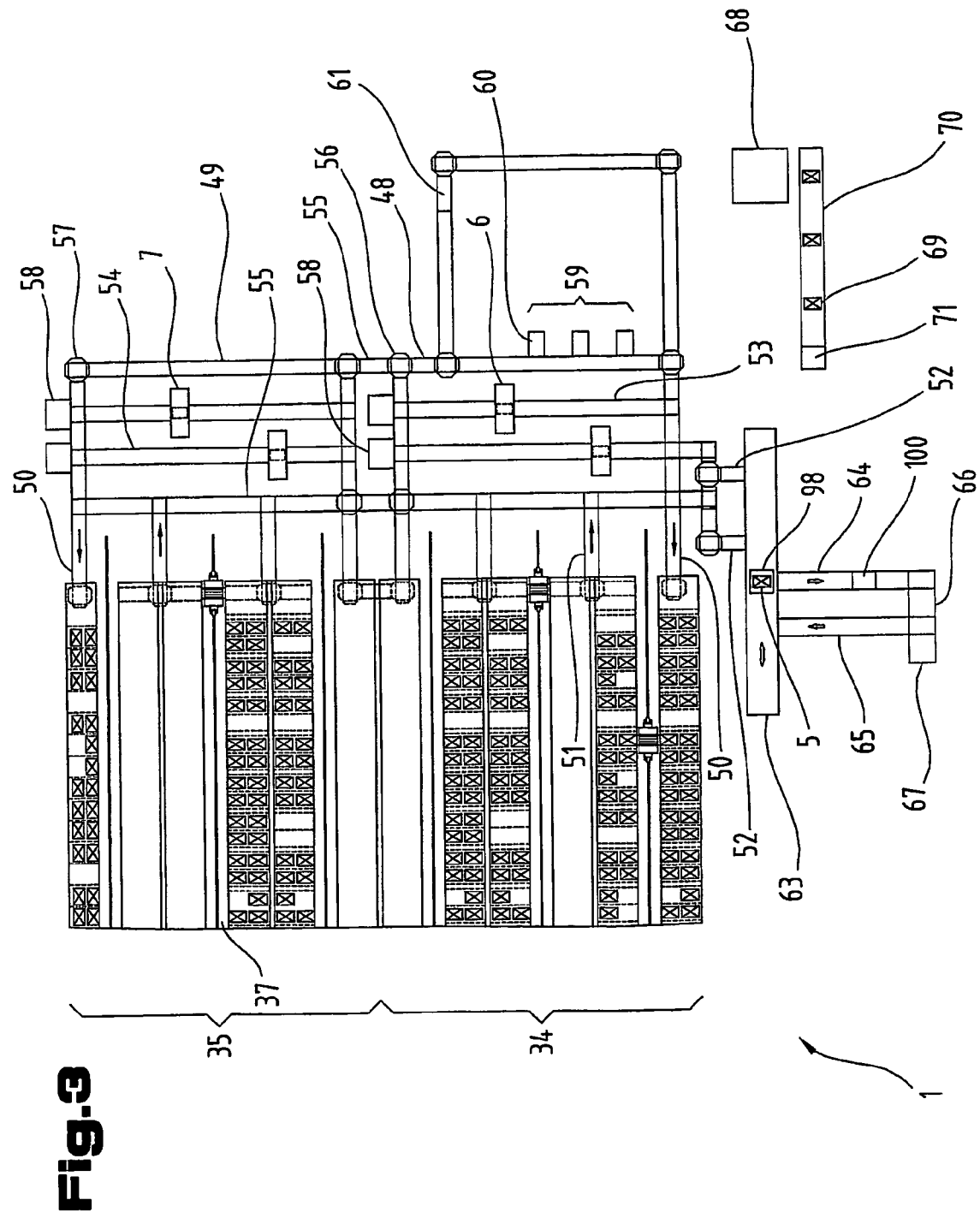
FIG. 3 is a detail showing a plan view of the goods-in store and de-palletising units of the warehouse system proposed by the invention.

As illustrated in FIG. 3, the storage unit distribution system in the transfer level has a distribution vehicle 98 which is able to move along a conveyor system 63 as well as a gating-out track 64 and a gating-in track 65. The conveyor system 63 is adjoined by the conveyor tracks 52. The gating-out and gating-in tracks 64, 65 are connected to the conveyor system 63 at one end and to one another via a conveyor track 66 at their other end. The conveyor track 66 is adjoined by a stacking device 67.

In addition, a manipulating device 68 for load carriers 69, for example a robot and a conveyor track 70, are provided on the transfer level as well as a lifting device 71. The lifting device 71 links the conveyor track 70 to a conveyor track 72 (FIG. 4) on the third level.

On the third level (FIG. 4), the warehouse system 1 has at least one packing station 87 adjoining the storage unit distribution system and packaging unit distribution system. Packaging units 2 of the second classification group of a first or second weight category (first and second classification subgroup) and/or dimensional category and similar can be handled at this packing station 87.

Figure 4:
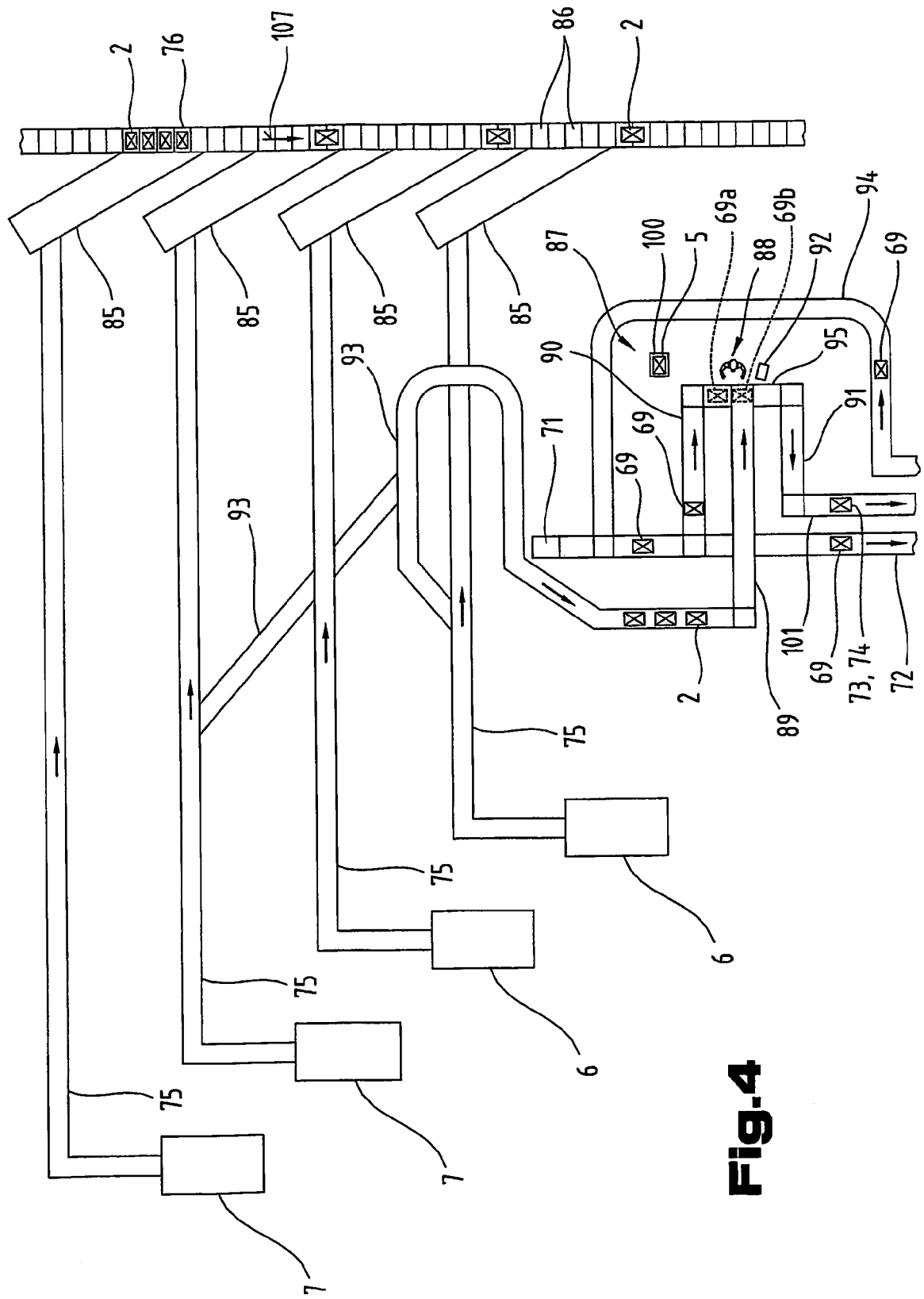
FIG. 4 is a plan view showing separating tracks, a detail of a circular sorting machine and a packing station of the warehouse system proposed by the invention.
Figure 11:
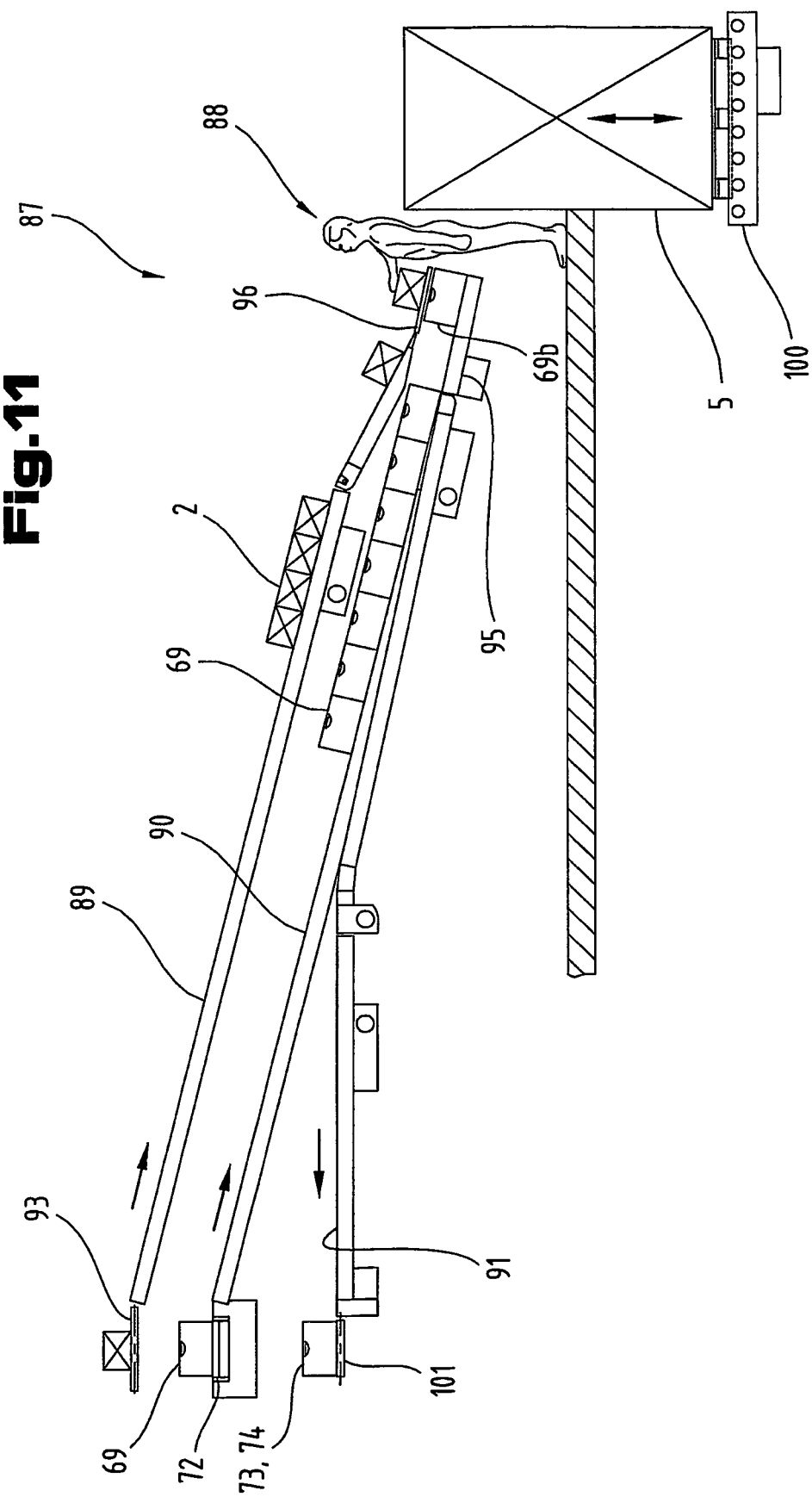
FIG. 11 is a side view of the packing station illustrated in FIG. 4.

As may be seen by looking at FIGS. 4 and 11 together, the packing station 87 comprises a processing track 89 extending downwards at an angle in the direction towards a warehouse operator 88 for conveying packaging units 2 of a second weight category and/or dimensional category and similar, a processing track 90 extending downwards at an angle in the direction towards the warehouse operator 88 for conveying empty load carriers 69, a gating-in track 91 for loaded load carriers 69 and freight and storage carriers 73, 74. The processing track 90 for empty load carriers 69 and the gating-in track 91 are connected to one another by a conveyor track 95 extending underneath the processing track 89 for packaging units 2. The processing track 89 for the packaging units 2 is adjoined by a conveyor track 93 of the packaging unit distribution system, and the conveyor track 93 branches off from the separating tracks 75. In order to bring in empty load carriers 69, the processing track 90 is adjoined by a conveyor track 72, to which a conveyor track 94 also runs, conveying storage carriers 74 as they become empty due to picking from the second temporary store 9. In addition, the packing station 87 is also equipped with an input and/or output device 92. It would also be possible to provide several packing stations 87.

As may be seen from FIGS. 4 and 11, the packing station 87 is also adjoined by the storage unit distribution system, where packaging units 2 of a first weight category and/or dimensional category and similar are placed in readiness on the storage unit 5 by means of a lifting device 100.

When a first top-up order occurs, at least one storage unit 5 with packaging units 2 of a first weight category and/or dimensional category and similar is moved out of storage by the shelf conveyor vehicle 43 and conveyed via the outbound track 51 and optionally the connecting track 55 to the left-hand conveyor track 52. On arriving there, the storage unit 5 is picked up by the distribution vehicle 98 and conveyed by it to the gating-out track 64 as far as the lifting device 100. The lifting device 100 picks up the storage unit 5 together with the packaging units 2 of the first weight category and lifts it to the third level as far as a predefined service height at which the warehouse operator 88 is able to take hold of the packaging units 2 under ergonomic conditions and load them into at least one empty load carrier 69. Beforehand, the empty load carrier 69a is conveyed from the processing track 90 to the conveyor track 95 and placed in readiness in the filling position indicated.

Once the required packaging units 2 have been re-packed, this is confirmed at the input and/or output device 92 and the storage unit 5 is lowered by the lifting device 100 to the gating-out track 64. The filled load carrier 69 is conveyed as a freight or storage carrier 73, 74 by the conveyor track 95 via the gating-in track 91 to a goods-in conveyor track 101 of a load carrier distribution system linking the packing station 87 and the second temporary store 9.

If there are still packaging units 2 on the delivery pallet 32, the "opened" storage unit 5 is conveyed via the conveyor track 66 to the gating-in track 65 and transferred to the distribution vehicle 98. It takes the "opened" storage unit 5 to the right-hand conveyor track 52 and transfers it to the conveyor track 52. It is then conveyed via the inbound track 50 and optionally the connecting track 55 to the shelf conveyor vehicle 43, which places the "opened" storage unit back in storage in the goods-in store 4.

If, on the other hand, all the packaging units 2 have been removed from the delivery pallet 32, the empty delivery pallet 32 is lowered by the lifting device 100 onto the gating-out track 64. The empty delivery pallet 32 is then conveyed by the conveyor track 66 to the stacking device 67 and stacked in a pile. Once they have reached a specific height, the stacks are conveyed via the gating-in track 65 to the distribution vehicle 98, which transfers them to the right-hand conveyor track 52. The stack is then conveyed across part-sections of the conveyor tracks 48 to the sorting unit 59, where the different types of delivery pallets 32 are sorted into types and stacked in types at the collection stations 60.

When a second top-up order occurs, the packaging units 2 of the second weight category and/or dimensional category and similar are conveyed via the conveyor tracks 93 to the packing stations 87 on the processing track 89 in a removal position indicated in FIG. 11 in which the packaging unit 2 is supported on a support plate 96. Beforehand, at least one empty load carrier 69b is conveyed from the processing track 90 to the conveyor track 95 and placed in readiness in a filling position underneath the removal position. The support plate 96 together with the packaging unit 2 is moved to a point above a load carrier 69b to be filled. On the return movement of the support plate 96 and by holding the packaging unit 2 back in the removal position, the support underneath the packaging unit 2 is moved away and the packaging unit 2 drops into the load carrier 69.

The filled load carrier 69b is conveyed as a freight carrier 73 from the conveyor track 95 via the gating-in track 91 to a goods-in conveyor track 101 of a load carrier distribution system linking the packing station 87 and the second temporary store 9.

Figure 12:
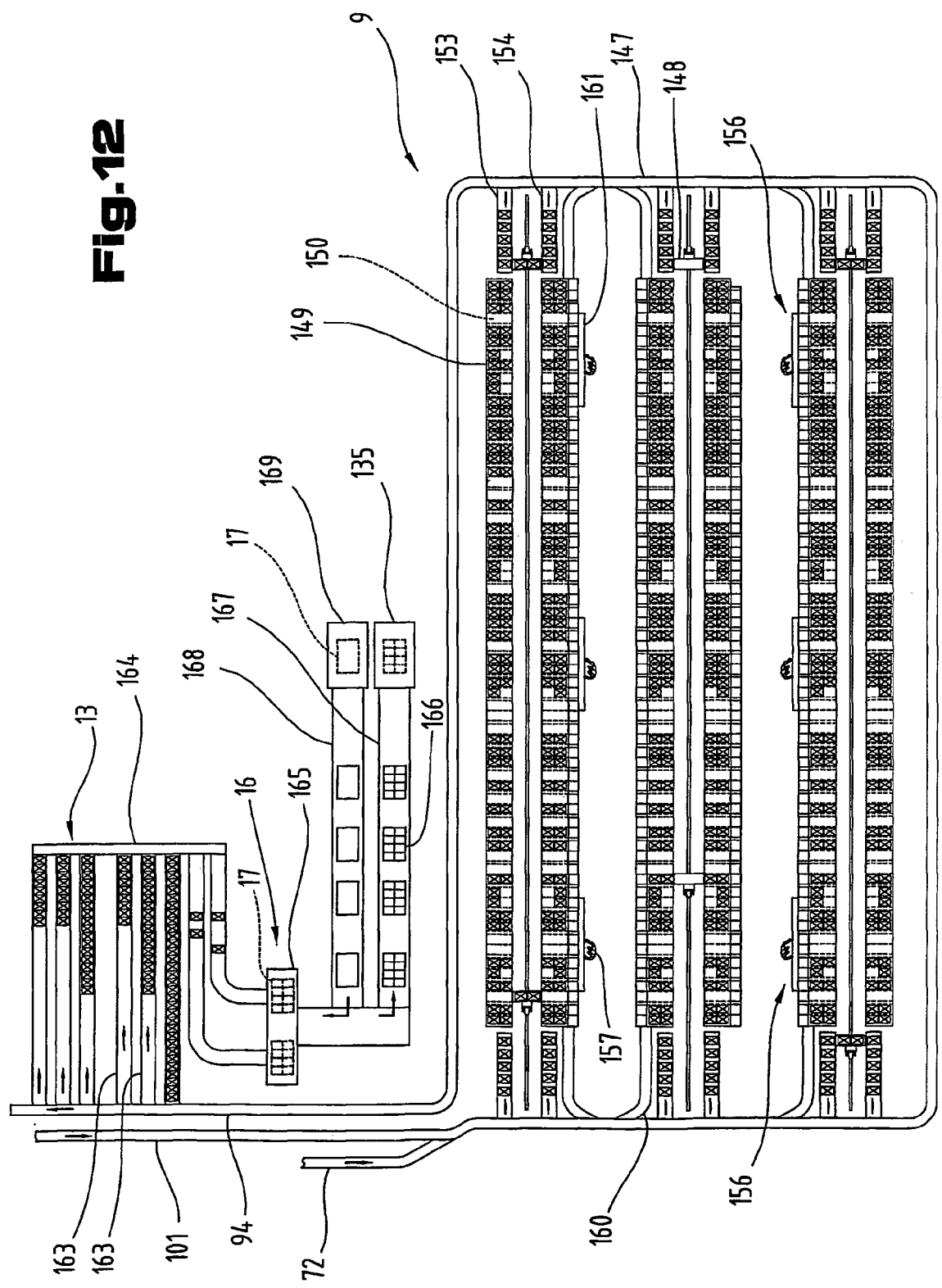
FIG. 12 is a plan view of a second temporary store for storing freight and storage carriers and an order buffer.
Figure 13:
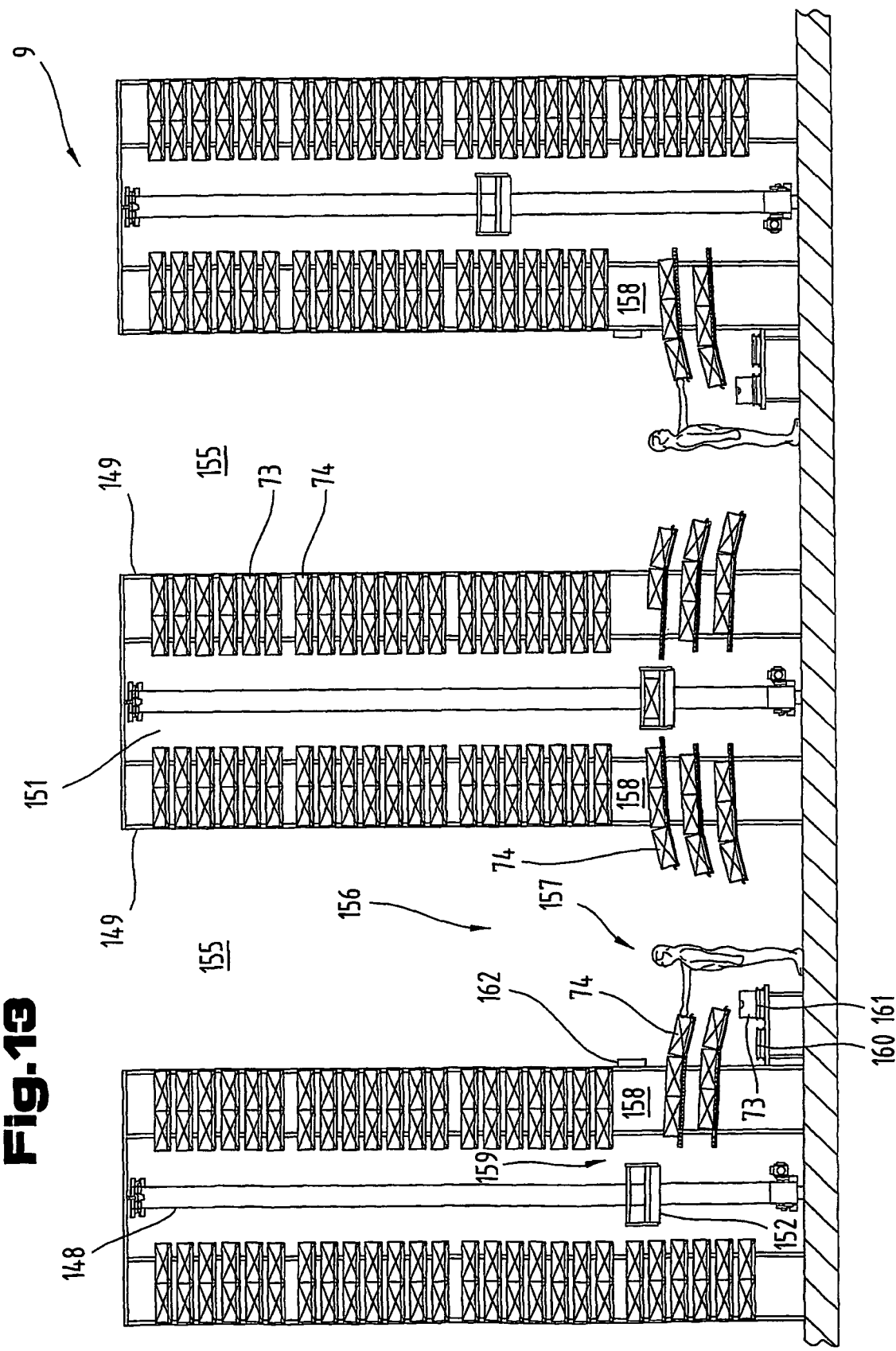
FIG. 13 is a view in elevation showing the second temporary store illustrated in FIG. 12.

FIGS. 3, 12 and 13, which will be described together, illustrate an automated load carrier distribution system for packaging units 2 of the second classification group, comprising, in several conveyor sections, the conveyor tracks 70, 72, a conveyor track 147, a goods-in conveyor track 101 adjoining the latter for bringing the freight and storage carriers 73, 74 to the second temporary store 9 and a conveyor track 94 adjoining the conveyor track 147 for returning empty load carriers 69 to the packing station 87 and delivering freight carriers 73 to the order buffer 13 as well as the computer-controlled shelf conveyor vehicles 148 disposed in the second temporary store 9.

The second temporary store 9 has storage shelves 149 arranged in parallel, in which the freight and storage carriers 73, 74 are stored in double-depth storage passages 150. Disposed between the storage shelves 149 are aisles 151 in which the shelf conveyor vehicles 148 are able to move. The shelf conveyor vehicles 148 are in turn equipped with a platform 152 which can be raised and lowered and a load bearing device (not illustrated) disposed on it, by means of which the freight and storage carriers 73, 74 can moved in and out. At their terminal ends, the aisles 151 are each provided with an inbound track 153 and outbound track 154, by means of which freight and storage carriers 73, 74 can be brought in and transferred to a shelf conveyor vehicle 148 on the one hand and freight and storage carriers 73, 74 can be transferred from the shelf conveyor vehicle 148 to the outbound track 154 on the other hand.

The adjacent storage shelves 149 are respectively spaced at a distance apart to make room for picking aisles 155 between them, inside which the at least one or more picking spaces 156 are disposed. The picking personnel 157 move through the picking aisles 155 on a floor.

Disposed in the region of the picking spaces 156 is a plurality of continuous passages 158 and, in the diagram shown in FIG. 13, there are three levels one above the other on the right-hand side, for example, and two levels one above the other on the left-hand side, for example. The continuous passages 158 extend across the entire length of the storage shelf 149. The continuous passages 158 each have a conveyor unit (roller track) inclined towards the picking area 156, a transfer area 159 open towards the respective shelf conveyor vehicle 148 as well as a picking position at the picking space end. The length of each roller track is selected so that it is preferably capable of accommodating three storage carriers 74 one after the other. The storage carriers 74 removed from the storage shelves 149 by means of the load bearing device are fed from the respective shelf conveyor vehicle 148 to the transfer areas 159 of the continuous passages 158 and from here move by force of gravity across the roller tracks into their respective picking position or, if this is already occupied, into an adjoining middle position or, if this is also occupied, into the rearmost position. Inside a continuous passage 158, the articles are already sorted into types in the storage carriers 74.

Disposed in each picking aisle 155 is a conveyor track 160, which is connected at its ends to the conveyor track 147 and runs parallel with the storage shelf 149. In addition, a picking track 161 is provided in every picking area 156, inside a picking aisle 155 extending parallel with the conveyor track 160, which is connected via an inbound and outbound gating system (not illustrated) to the conveyor track 160. The picking track 161 extends across only part of the length of the conveyor track 160.

A customer order detected by the computer, in particular the warehouse management computer, may also contain a picking order for one or more pickers 157. The picker 157 is guided through the individual picking operations by means of an input and/or output device 162, for example displays are provided at the individual continuous passages 158 on which the picking quantity is displayed. To ensure that the picking operation can be carried out efficiently, a load carrier 69 which becomes empty during the picking operation is used as the freight carrier 73. Alternatively, the empty freight carriers 73 can be conveyed via the conveyor tracks 72, 160 and conveyor track 147 to the relevant picking area 156 and conveyed via the outbound gating system to the picking track 161. On arriving there, the picker 157 can take the picking quantity specified on the output device 162 from the same or different packaging units 2 out of one or more storage carriers 74 positioned in readiness at the continuous passages 158 and place them in one or more freight carriers 73 waiting in readiness on the picking track 161.

If the freight carrier 73 at this picking area 156 can be filled with all the packaging units 2 needed for this picking order, the full freight carrier 73 is conveyed from the picking track 161 via the inbound gate system to the conveyor unit 160 and by it via the conveyor track 147 to the order buffer 13. The picker 157 acknowledges the picking operation from the input device 162.

If, on the other hand, the freight carrier 73 could only be "partially picked" in this picking area 156, it is conveyed to one or more other picking spaces 156 in the same picking aisle 155 or to another picking aisle 155. If articles from the second picking aisle 155 are needed, the freight carrier 73 only partially filled for the picking order is moved from picking track 161 of the picking area 156 and gated onto the conveyor track 160 in the first picking aisle 155 and then conveyed via conveyor track 147 to conveyor track 160 in the second picking aisle 155, after which it is conveyed to one of the picking spaces 156 where the articles needed for this picking order are waiting in readiness in at least one storage carrier 74. On arriving there, the picker 157 will see the picking quantity displayed on the output device 162 and places the indicated corresponding quantity of packaging units 2 in the "partially picked" freight carrier 73. The freight carrier 73 may now contain all the packaging units 2 needed for this picking order or is conveyed to another picking area 156 so that the picking operation can continue. The end of the picking operation is again terminated by the picker 157 who acknowledges such at the input device 162.

In the order buffer 13, the first freight carriers 73, already assembled in the packing station 87 and temporarily stored in the temporary store 9, as well as the second freight carriers 73 prepared during the picking operation are sorted according to customer orders and temporarily stored.

The order buffer 13 comprises a plurality of buffer tracks linked via the outbound gating system (not illustrated) to the conveyor track 94 and extending parallel with one another. The buffer tracks are connected to a conveyor track 164 at their ends lying opposite the goods-in end, by means of which the freight carriers 73 are fed to the second loading station 16, in particular an automatic stacking device 165. The second loading station 16 may also comprise several automatic stacking devices 165.

Within a buffer track 163, only the freight carriers 73 needed for a customer order from one outlet (retail outlet) are assembled. If a customer order is made up of orders from several outlets, the freight carriers 73 for each of these outlets are assembled in a separate buffer track 163. If a large order is received from one outlet, the freight carriers 73 may also be temporarily stored in more than one buffer track 163. If the freight carriers 73 needed for one outlet are held in readiness in one or more buffer tracks, they are conveyed to the second stacking device 165 and stacked on one or more second despatch pallets 17, for example roll containers, pallets. Once the stack on the second despatch pallet 17 is ready, the stack is secured with a securing means, for example wrapped in a film, and conveyed as a freight unit 166 ready for despatch from a conveyor unit 167 to the lifting device 135, by means of which it is lowered to the goods-in and despatch level, after which it is conveyed by the outbound track 136 illustrated in FIG. 14 to one of the despatch stations 137, where the consolidation operator removes the freight unit 166 and deposits it in one of the goods-out buffer zones 21 depending on a delivery sequence.

The second stacking device 165 is supplied with empty despatch pallets 17 sent via a conveyor unit 168 from a despatch pallet store 169.

The method of operating a warehouse system 1 proposed by the invention, in particular storage, distribution and/or picking a plurality of different packaging units 2 will be explained below.

In the first step, the computer, in particular the warehouse management computer, detects a customer order, which may comprise one or more first and/or second despatch pallets 15. When the storage units 5 delivered to the goods-in entrance 3 are transferred to the receiving station 28 by the warehouse operator 26, the packaging units 2 are identified at the inspection station 31 by reading the data from the data carrier and placed in storage in the goods-in store 4.

The computer detects the article properties and packaging unit properties of every packaging unit 2 to be placed in storage, such as the dimensions, weight, density, tipping factor (ratio between a side length and height of the packaging unit), stability, tightness of the closing means of a packaging unit 2 filled with liquid, packaging type, for example cardboard, plastic, carrying features and/or shape of the packaging unit 2 and such like and stores these as master data in a data bank of the management system. A conveying property is determined for every article (packaging unit) from these article properties, preferably by a computer programme or by empirical tests.

The warehouse system 1 proposed by the invention supplies several hundreds to thousands of different articles, a plurality of which articles are assigned to a first classification group, a second classification group and a remaining quantity to a third classification group. The conveying property defines these classification groups.

The first classification group comprises those articles which can be conveyed automatically by means of the packaging unit distribution system described above, placed in and removed from the first temporary store 8 automatically and stacked on the despatch pallet 15 automatically by the first stacking device 128. Such packaging units 2 are usually packaging units in the form of cardboard or with a stable base and wrapped with a plastic film.

The articles (packaging units) of the second classification group can be conveyed by the packaging unit distribution system described above but only in certain conveyor sections and cannot be moved in and out of the first temporary store and stacked automatically by the first stacking device.

Articles from the second classification group may additionally be sub-divided into other classification sub-groups on the basis of weight categories and another of the article properties. For example, articles within the first weight category, for example up to 10 kg, are not conveyed by the packaging unit distribution system and have to be placed on the delivery pallet 32 at the packing station 87 on the lifting device 100. Articles in the first classification sub-group are articles with a lower weight and small dimensions, for example.

Articles from the second classification sub-group can be automatically removed from pallets and are conveyed through only some of the conveyor sections of the packaging unit distribution system, in particular by the conveyor track 93 to the packing station 87. These articles are articles falling within the second weight category, for example more than 10 kg, which are assembled to form a packaging unit by means of a packaging film but do not have a stable base.

The articles of the third classification group may not be conveyed into the first temporary store for placing in or removing from storage by the automatic packaging unit distribution system and/or stacked by the first stacking device 128. These articles are bulky or irregular-shaped items which have to be loaded manually onto a first despatch pallet 15 by a warehouse operator 141, as described above.

When a customer order is being processed, a storage unit 5 is taken out of the goods-in store 4. At the time the storage unit 5 is taken out and from the earlier process of identifying the packaging unit 2 at the receiving station 28, it is already known what the conveying property/properties of the packaging unit 2 are and which classification group the packaging unit 2 belongs to.

The conveying property and classification determined from the packaging unit properties (article master data) by means of a computer programme running on the computer or empirical tests carried out on every article (packaging unit) and the group detected by the computer are stored in a data bank so that they can be retrieved. When a packaging unit 2 is identified by the packaging unit identification system, in particular data from the data carrier for example, an identification code is detected by the computer, which identification code is used to access the packaging unit properties allocated to it and retrieved from the data bank, so that the first or second classification group is set and a packaging unit 2 is automatically conveyed either via the packaging unit distribution system to the first loading station 14 or via the packing station 87 to the second loading station 16. If the packaging units 2 (bulky items) designated as belonging to the third classification group, they are placed directly in storage in the storage area 142 of the goods-in store 4 by the storage unit distribution system.

When a customer order—which usually contains a plurality of identical or different packaging units 2—is detected by the computer, it is known at this time how the packaging units 2 for this order must be distributed in the warehouse system 1.

Packaging Units of the First Classification Group:

If the packaging units 2 are identified as belonging to the first classification group, the storage unit 5 is conveyed by the shelf conveyor vehicle 43 from the goods-in and despatch level and lifted to the transfer level and moved to one of the two conveyor tracks 48, 49 to at least one de-palletising unit 6, 7. On arrival there, the packaging units 2 needed for a customer order are removed from the storage units, preferably in layers. If at least one stack layer of packaging units 2 is still left on delivery pallet 32, the storage unit 5 is moved back into storage in the goods-in store 4. The de-palletised packaging units 2 are conveyed separately in the manner described above to the circular sorting machine 76. On arrival there, the packaging units 2 move through the individual sorting stages and are conveyed to the first loading station 14 in a loading sequence determined beforehand by the computer on receipt of the customer order calculated on the basis of a spatial loading configuration. The packaging units 2 are preferably stacked on the first despatch pallet 15 automatically by the first stacking device 128. It would also be possible for them to be stacked manually by a warehouse operator.

If a customer order is made up of several first despatch pallets, the changing device replaces the despatch pallet fully loaded with a stack with an empty despatch pallet. The loaded despatch pallet 15 together with the loading aid 130 is conveyed to the wrapping station 132 in the manner described above and the stack wrapped with a securing means before being sent as a freight unit 133 ready for despatch to the consolidation area 18 and placed in readiness at a despatch station 137.

Packaging Units of the Second Classification Group:

If the customer order includes packaging units 2 of the second classification group, freight carriers 73 of the first and/or second classification sub-group, in other words freight carriers 73 containing articles of the first weight category or second weight category, held in readiness in the second temporary store 9 are moved out of storage by the shelf conveyor vehicle 148 and conveyed to the order buffer 13.

On the other hand, the customer order may also contain at least one picking order. To this end, an empty freight carrier 73 from the second temporary store 9 is filled with the packaging units 2 needed for this picking order, in particular the first classification sub-group (first weight category), in at least one picking area 156, and is also conveyed to the order buffer 13 once the picking order is complete. Once the sorted freight carriers 73 making up a customer order have been assembled in the order buffer 13 in the manner described above, they are conveyed to the second loading station 16, where they are automatically stacked. The freight carriers 73 could also just as easily be stacked manually by a warehouse operator.

The stack on the despatch pallet 17 is then enclosed by a securing means before being sent to the consolidation area 18 and placed in readiness at the despatch stations 137.

The second temporary store 9 contains a limited stock of different packaging units 2 in the storage and freight carriers 73, 74. Once a minimum stock of packaging units 2 in the storage and/or freight carriers 73, 74 is reached, a top-up order is detected by the computer.

If packaging units 2 of the first weight category have to be sent to top up the second temporary store 9 to meet a top-up order in the freight and/or storage carriers 73, 74, at least one storage unit 5 is taken out of the goods-in store 4 by the shelf conveyor vehicle 43 in accordance with this order and conveyed through the storage unit distribution system to the packing station 87. Disposed in the packing station 87 is the input and/or output device 92 where the warehouse operator 88 is provided with a display showing the number of freight and storage carriers 73, 74 to be filled and the quantities with which every freight and storage carrier 73, 74 has to be filled. The warehouse operator 88 takes the packaging units 2 from the storage unit 5 and fills them one after the other with the requisite number of freight and storage carriers 73, 74. The end of an operation of filling a freight or storage carrier 73, 74 is confirmed at the input device 92. On confirmation, the freight or storage carrier 73, 74 is automatically conveyed to the second temporary store 9, where it is placed in storage by the shelf conveyor vehicle 148. The quantity with which the freight and storage carriers 73, 74 are filled is calculated by the computer on the basis of the master data in the data bank pertaining to each article, in particular with respect to its dimensions.

When a top-up order for packaging units 2 of the second weight category is detected by the computer, at least one storage unit 5 is taken out of the goods-in store 5 by the shelf conveyor vehicle 43 and conveyed to the de-palletising unit 6, 7, separated at the separating track 75 and gated out onto the branch of the conveyor track 93 to the packing station 87 and conveyed to the packing station 87. The warehouse operator 88 is provided with a display at the input and/or output device 92 indicating the number of freight carriers 73 to be filled and the quantity with which each freight carrier 73 must be filled. The end of a filling operation is again acknowledged at the input device 92. On acknowledgement, the freight carrier 73 is automatically conveyed to the second temporary store 9 where it is placed in storage by the shelf conveyor vehicle 148.

Packaging Units of the Third Classification Group:

The packaging units 2 (bulky items) of the third classification group are taken out of storage directly from the goods-in store 5 from a storage area 142 specifically provided for them by a warehouse operator 141 with a distribution vehicle and loaded onto a first despatch pallet 15.

Having identified the "partially loaded" freight unit 133, for example by scanning a barcode, the warehouse operator 141 obtains information from the input and/or output device 143 about the packaging unit(s) 2 which need to be taken from the storage area 142 and a quantity of these packaging units 2 which need to be taken. The end of the picking operation is acknowledged at an input and/or output device 143 and the despatch-ready freight unit 133 is conveyed to the consolidation area 18 and placed in readiness at a despatch station 137.

Once ready for despatch, the freight units 133, 166 are lowered by the lifting device 135 to the goods-in and despatch level and conveyed via the outbound track 136 to the despatch stations 137. On arriving there, they are collected by a consolidation operator, preferably by means of a forklift truck 138, and transported to the depositing areas 23 in the goods-out buffer zones, where they are placed in the depositing areas 23 in a delivery sequence set in accordance with a customer order.

The consolidation operator communicates via an input and/or output device 170 with the computer where an electronic customer order list is stored in a data bank. The computer also contains a route planning module, by means of which an optimised route map is computed on the basis of the customer order detected by the computer, detailing how to get to one or more outlets and/or the optimised delivery sequence and optimised loading of the cargo space on the delivery transport vehicle 171 (FIG. 14). A customer order for a commercial outlet is usually made up of several retail outlets (subsidiaries) and optimising the loading of the cargo space means that the freight units 133, 166 have to be loaded in the correct delivery sequence. The freight units 133, 166 that are delivered last must be loaded in the deepest loading position in the cargo space, whereas the freight units 133, 166 delivered first must be loaded in the foremost loading position in the cargo space.

Once a customer order has been assembled in the consolidation area 18, the freight units 133, 166 are loaded onto the delivery vehicle 171 at the goods-out exit 19, in particular a truck, docked at the goods-out stations 172.

FIG. 15 is a block diagram illustrating a warehouse system 175. As illustrated, the blocks illustrated to the right of the vertical broken line represent the warehouse system 1 described above. The blocks illustrated to the left of the vertical broken line represent an extension of the warehouse system 1.

The modified warehouse system 175 additionally comprises a second goods-in entrance 173 and a third temporary store 174, for example a store with vertical racking. The third temporary store 174 is disposed separately from the first and second temporary stores 8, 9. The goods-in entrance 173 is likewise separate from the goods-in entrance 3. Although not illustrated, the despatch units (freight units) delivered to the goods-in entrance 173 of receiving stations are stored in the third temporary store 174 by a freight unit distribution system and are taken out of storage by the freight unit distribution system for consolidation purposes and conveyed to one of several despatch stations. The freight unit is a delivery pallet, for example a EURO pallet with sorted or different packaging units (articles) stacked on it.

The third temporary store 174, in particular the freight unit distribution system, is described in Austrian patent application A 783/2008 filed by the same applicant and is included as part of the subject matter of this disclosure by way of reference.

The packaging units held in the third temporary store 174 are ones with a very high turn-around or so-called super-fast flyers (Super A-articles), i.e. very high quantities are turned around and in statistical terms, there are very frequent customer orders for these articles. The packaging units are temporarily stored in the third temporary store 174 for only two to seven days. The freight units are delivered in the form in which they arrive and as a result, no picking step is needed.

In the warehouse system 1 described above, packaging units 2 are handled which have a high turnaround, so-called fast flyers (A-articles) and packaging units 2 which have a medium to low turnaround, so-called medium and slow flyers (B-articles, C-articles).

A customer order may be made up of several, for example three, picking orders. For a first picking order, the packaging units 2 are loaded onto the first despatch pallet 15 at the first loading station 14. For a second picking order, the freight carriers 73 are loaded onto the second despatch pallet 17 at the second loading station 16. For a third picking order, the packaging units 2 are loaded onto the third despatch pallet at the third loading station 146.

A major advantage resides in the fact that these picking orders can be processed in parallel and, in a separate operation, one or more freight units can be removed from the third temporary store 174 and placed in readiness in the consolidation area 18 depending on a customer order, as illustrated in the block diagram of FIG. 15. The storage and distribution process of the despatch units, which include the super-fast flyer packaging units, is not held up by the storage, picking and distribution processes of the packaging units 2 in the warehouse system 1. Similarly, the storage, picking and distribution processes for the packaging units 2 of the first, second and third classification groups likewise take place separately in the warehouse system 1.

The customer order may be made up of freight unit(s) 133, 166 and/or despatch unit(s) and the consolidation operator in the consolidation area 18 described above receives the delivery and/or despatch unit(s) ready for despatch one after the other. He is therefore not "overwhelmed" with delivery and despatch units at any one time. The freight units 133, 166 and/or despatch units are then assembled in the consolidation area 18 in a delivery sequence set for transportation to the delivery vehicle 171 based on the customer order and are loaded onto the transport vehicle 171 in this sequence at the goods-out stations 172 in the goods-out exit 19.

The embodiments illustrated as examples represent possible variants of the warehouse system 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the warehouse system 1, it and its constituent parts are illustrated to a certain extent out of scale and/or on an enlarged scale and/or on a reduced scale.

The individual feature or combinations of features based on the embodiments illustrated and described as examples may also be construed as independent solutions proposed by the invention in their own right.

LIST OF REFERENCE NUMBERS

1 Warehouse system
2 Packaging unit
3 Goods-in entrance
4 Goods-in store
5 Storage unit
6 De-palletising unit
7 De-palletising unit
8 Temporary store
9 Temporary store
13 Order buffer
14 Loading station
15 Despatch pallet
16 Loading station
17 Despatch pallet
18 Consolidation area
19 Goods-out exit
20 Goods-in buffer zone
21 Goods-out buffer zone
22 Depositing area
23 Depositing area
24 Goods-in station
25 Supplier vehicle
26 Warehouse operator
27 Distribution vehicle
28 Receiving station
29 Conveyor track
30 Input and/or output device
31 Inspection station
32 Delivery pallet
33 Reading device
34 Storage area
35 Storage area
36 Storage shelf
37 Aisle
38 Storage passage
39 Conveyor track
40 Inbound track
41 Distributor track
42 Processing track
43 Racking conveyor vehicle
44 Switching conveyor device
45 Platform
46 Conveyor device
47 Inbound/outbound handling device
48 Conveyor track
49 Conveyor track
50 Inbound track
51 Outbound track
52 Conveyor track
53 Conveyor track
54 Conveyor track
55 Connecting track
56 Switching conveyor device
57 Switching conveyor device
58 Stacking device
59 Sorting unit
60 Collection station
61 Lifting device
62 Buffer area
63 Conveyor system
64 Gating-out track
65 Gating-in track
66 Conveyor track
67 Stacking device
68 Manipulating device
69 Load carriers
70 Conveyor track
71 Lifting device
72 Conveyor track 73 Freight carriers
74 Storage carriers
75 Separating track
76 Circular sorting machine
77 Device
78 Device
79 Conveying direction
80 Pushing device
81 Conveyor roller
82 Rotating device
83 Tilting device
84 Rotating device
85 Inbound gate conveyor
86 Conveyor support
87 Packing station
88 Warehouse operator
89 Processing track
90 Processing track
91 Gating-in track
92 Input and/or output device
93 Conveyor track
94 Conveyor track
95 Conveyor track
96 Support plate
97 Processing track
98 Distribution vehicle
99 Return track
100 Lifting device
101 Goods-in conveyor track
102 Inbound track
103 Racking conveyor vehicle
104 Sorting conveyor system
105
107 Conveyor circuit
108 Storage shelf
109 Storage shelf
110 Aisle
111 Storage passage
112 Platform
113 Processing track
114 Processing track
115 Buffer station
116 Outbound gating system
117 Rotating device
118 Order passage
119 Overflow passage
120 Packaging unit group
121 Outbound track
122 Loading conveyor track
123 Platform
124 Overflow track
125 Buffer station
126 Outbound gating system
127 Rotating device
128 Stacking device
129 Conveyor unit
130 Loading aid
131 Conveyor unit
132 Wrapping station
133 Freight unit (Collis)
134 Conveyor unit
135 Lifting device
136 Outbound track
137 Despatch station
138 Forklift truck
139 Fitting device
140 Despatch station
141 Warehouse operator
142 Storage area
143 Input and/or output device
144 Receiving station
145 Conveyor unit
146 Loading station
147 Conveyor track
148 Shelf conveyor vehicle
149 Storage shelf
150 Storage passage
151 Aisle
152 Platform
153 Inbound track
154 Outbound track
155 Picking aisle
156 Picking area
157 Picker
158 Continuous passage
159 Transfer area
160 Conveyor track
161 Picking track
162 Input and/or output device
163 Buffer track
164 Conveyor track
165 Stacking device
166 Freight unit
167 Conveyor unit
168 Conveyor unit
169 Freight pallet store
170 Input and/or output device
171 Delivery vehicle
172 Goods-out station
173 Goods-in entrance
174 Temporary store
175 Warehouse system

The invention claimed is:

1. A method of operating a warehouse system comprising:
(a) placing a plurality of different packaging units into in storage in a goods-in store on delivery pallets as storage units;
(b) detecting packaging unit properties in a data bank, wherein the packaging unit properties are selected from the group consisting of dimensions, weight, density, tipping factor, stability, the seal of a closure of a packaging unit filled with liquid, packaging type, transportability, and the shape of the packaging unit;
(c) setting by a computer an appropriate classification group for each packaging unit on the basis of the packaging unit properties by
defining a first classification group comprising a first set of packaging units able to be de-palletized from the storage units by at least one de-palletizing device, conveyed via an automated packaging unit distribution system, distributed in an automated first temporary store, and moved out of storage in the first temporary store as needed for a customer or picking order and loaded by an automated stacking device at a first loading station onto a first dispatch pallet; and
defining a second classification group comprising a second set of packaging units able to be conveyed to a packing station where several of the packaging units of the second set of packaging units are able to be manually repacked in at least one load carrier;
(d) de-palletizing a plurality of packaging units needed for the customer or picking order from the first set of packaging units by the at least one de-palletizing device, conveying the packaging units via the automated packaging unit distribution system, distributing the packaging units in the automated first temporary store, moving the packaging units out of storage in the first temporary store and loading the packaging units by the automated stacking device at the first loading station onto the first dispatch pallet;

(e) manually repacking a plurality of packaging units from the second set of packaging units in the at least one load carrier and subsequently conveying the at least one load carrier via an automated load carrier distribution system to a second temporary store for distribution of the packaging units; and (f) loading the at least one load carrier and the packaging units from the first set of packaging units needed for the customer or picking order onto a second dispatch pallet at a second loading station.

2. The method as claimed in claim 1, wherein having been de-palletized, the packaging units of the first classification group are removed from the storage units individually and conveyed to the first loading station, wherein the packaging units of the first classification group that have been de-palletized are sorted in several stages.

3. The method as claimed in claim 2, wherein the packaging units are conveyed by the packaging unit distribution system on the basis of sorting criteria predefined by the computer in one of the sorting stages, wherein the sorting criteria comprise warehouse or performance indicators of the packaging unit distribution system in one of its conveyor sections, and wherein the packaging units conveyed on the basis of the sorting criteria are conveyed to storage shelves in the first temporary store, wherein the storage shelves are assigned on the basis of these sorting criteria.

4. The method as claimed in claim 2, wherein the packaging units are conveyed by the packaging unit distribution system on the basis of a warehouse indicator predefined by the computer in one of the sorting stages and are conveyed to storage positions in the first temporary store, wherein the storage positions are assigned on the basis of the warehouse indicator.

5. The method as claimed in claim 2, wherein the packaging units are placed in storage by a packaging unit distribution system in one of the sorting stages, wherein the packaging units are sorted on the basis of picking orders, and wherein the packaging units are stored in order-related storage passages in the first temporary store.

6. The method as claimed in claim 5, wherein when the packaging units are being placed in storage in the order-related storage passages and the packaging unit groups are being taken out of storage from the order-related storage passages, the packaging units and packaging unit groups are additionally sorted on the basis of sorting criteria predefined by the computer in a loading sequence determined on the basis of their spatial loading configuration in a stack on the first dispatch pallet, wherein the sorting criteria comprise warehouse or performance indicators of the packaging unit distribution system in a conveyor section of the packaging unit distribution system.

7. The method as claimed in claim 2, wherein the packaging units needed for a picking order are taken out of storage by a packaging unit distribution system from order-related storage passages in the first temporary store as several packaging unit groups in parallel in one of the sorting stages and wherein the packaging unit groups are sorted into a defined sequence.

8. The method as claimed in claim 2, wherein the packaging units are conveyed within a packaging unit group by a packaging unit distribution system on the basis of sorting criteria predefined by the computer in one of the sorting stages and then conveyed to the first loading station, wherein the sorting criteria comprise warehouse or performance indicators of the packaging unit distribution system in a conveyor section of the packaging unit distribution system.

9. The method as claimed in claim 1, wherein the packaging units are de-palletized by the de-palletizing unit and removed from the storage units individually, and wherein the packaging units separated from the at least one stack layer removed are placed in storage in an appropriate number relating to a picking order in at least one order-related storage passage of the first temporary store, and wherein the remaining number of packaging units are placed in storage in at least one free storage passage.

10. The method as claimed in claim 1, wherein in the packing station, the packaging units are repacked by load carriers in the form of storage carriers or the first freight carriers and wherein the packaging units are placed in readiness by the storage carriers in at least one picking area, and wherein the packaging units needed for a picking order are removed from at least one storage carrier and placed in at least one second freight carrier.

11. The method as claimed in claim 10, wherein the first and second freight carriers are placed in an order buffer and wherein the first and second freight carriers are sorted according to customer orders before being loaded onto the second dispatch pallet.

12. The method as claimed in claim 1, wherein the second temporary store has continuous passages, which have a picking position at their end facing the picking area respectively, wherein the storage carriers are placed in readiness in the continuous passages and wherein a picker is able to remove the packaging units from the storage carriers in accordance with the picking order, wherein the second temporary store further has a respective transfer area at its end facing the picking area where the storage carriers brought in from the temporary store can be transferred to an associated continuous passage.

13. The method as claimed in claim 1, wherein at least one storage unit is conveyed from the goods-in store to the packing station and wherein packaging units of the second classification group conveyed to the packing station in at least a first freight carrier or storage carrier are repacked if a warehouse indicator in the second temporary store falls below a desired value.

14. The method as claimed in claim 1, wherein at least one storage unit is conveyed from the goods-in store to a de-palletizing unit where packaging units are de-palletized and wherein the packaging units are then repacked into at least a first freight carrier at the packing station if a warehouse indicator in the second temporary store falls below a desired value.

15. The method as claimed in claim 1, wherein a third classification group is defined for those packaging units which have been placed in readiness in the goods-in store as storage units and wherein the packaging units needed for a picking order are taken out of these packaging units in the third classification group and loaded onto the first dispatch pallet placed in readiness for this picking order.

16. The method as claimed in claim 1, wherein the goods-in store has storage shelves with storage passages disposed adjacent to one another in storage levels one above the other and a storage unit distribution system, and wherein the storage units are transferred from goods-in stations at the goods-in entrance and fed to the storage unit distribution system and distributed by the storage unit distribution system to the storage shelves on the basis of a warehouse indicator determined by the computer.

17. The method as claimed in claim 1, wherein the storage unit distribution system has a conveyor track directly adjoining a terminal end of the storage shelves on a goods-in and goods-out level, and wherein the inbound storage units circulate on the conveyor track if the performance indicator of the dispatch unit distribution system reaches a desired value.

18. The method as claimed in claim 1, wherein the goods-in store is divided into storage areas and wherein the storage unit distribution system has conveyor tracks directly adjoining a terminal end of the storage shelves on a transfer level, and wherein the storage units are conveyed out of the first storage area via the storage unit distribution system to the first conveyor track and out of the second storage area via the storage unit distribution system to the second conveyor track and then by the conveyor tracks respectively to at least one de-palletizing unit.

19. The method as claimed in claim 1, wherein a third temporary store is provided in the warehouse system and wherein the method further comprises the following steps:
 a) dispatch units are placed in storage and distributed by a dispatch unit distribution system in the third temporary store;
 b) at least one dispatch unit is taken out of storage by the dispatch unit distribution system and the dispatch unit is placed in readiness in the consolidation area in accordance with a customer order detected by the computer;
 c) the packaging units of at least one freight unit are distributed and packed and the freight unit is placed in readiness in the consolidation area in accordance with the customer order; and
 d) the dispatch and freight units are assembled in the consolidation area in a delivery sequence set in accordance with the customer order in readiness for transportation on a delivery vehicle, and wherein steps a) to d) are run in parallel.

20. A warehouse system for operating the method as claimed in claim 1, the warehouse system comprising
 a goods-in store in which a plurality of different packaging units are placed in storage on delivery pallets serving as storage units, and wherein packaging unit properties of the packaging units are selected from the group consisting of dimensions, weight, density, tipping factor, stability, the seal of a closure of a packaging unit filled with liquid, packaging type, transportability and the shape of the packaging unit and wherein the packaging unit properties are detected in a data bank, and
 a computer connected to a data bank for setting an appropriate classification group for each packaging unit on the basis of the packaging unit property,
 wherein for the packaging units assigned to the first classification group, a de-palletizing unit is provided for de-palletizing the packaging units from the storage units, an automated packaging unit distribution system is provided for conveying the packaging units, an automated first temporary store is provided for the packaging units and a first loading station with an automated stacking device for loading a dispatch pallet, and
 wherein for the packaging units assigned to a second classification group, a packing station is provided for manually repacking packaging units in at least one load carrier, an automated load carrier distribution system is provided for conveying load carriers to a second temporary store, a second temporary store is provided for the loading carriers, and a second loading station is provided for loading a dispatch pallet.

21. The warehouse system as claimed in claim 20, further comprising
 a storage unit distribution system and
 a packaging unit distribution system and
 at least one de-palletizing unit for transferring the packaging units of the second classification group and
 at least one packing station for loading at least one storage carrier or first freight carriers formed by a load carrier as well as
 a second temporary store for temporarily storing the load carriers, and
 wherein the storage unit distribution system connects the goods-in store and packing station and
 wherein the packaging unit distribution system connects the de-palletizing unit and packing station.

22. The warehouse system as claimed in claim 21, further comprising
 at least one picking area, wherein the packaging units needed for a picking order are removed at the at least one picking area from at least one storage carrier and placed in at least one second freight carrier.

23. The warehouse system as claimed in claim 20, wherein the packaging unit distribution system comprises a circular sorting machine.

* * * * *

UNITED STATES PATENT AND TRADEMARK OFFICE
CERTIFICATE OF CORRECTION

PATENT NO. : 8,494,673 B2
APPLICATION NO. : 12/736905
DATED : July 23, 2013
INVENTOR(S) : Miranda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this
Fifteenth Day of September, 2015

Michelle K. Lee
*Director of the United States Patent and Trademark Office*